US012707307B2

(12) United States Patent
Manolakos et al.

(10) Patent No.: US 12,707,307 B2
(45) Date of Patent: Aug. 11, 2026

(54) REPORTING CONFIGURATIONS FOR CHANNEL AND INTERFERENCE MEASUREMENT

(71) Applicant: Qualcomm Incorporated, San Diego, CA (US)

(72) Inventors: Alexandros Manolakos, Escondido, CA (US); Yan Zhou, San Diego, CA (US); Yu Zhang, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1167 days.

(21) Appl. No.: 17/436,535

(22) PCT Filed: Mar. 29, 2019

(86) PCT No.: PCT/CN2019/080530
§ 371 (c)(1),
(2) Date: Apr. 25, 2022

(87) PCT Pub. No.: WO2020/198977
PCT Pub. Date: Oct. 8, 2020

(65) Prior Publication Data

US 2022/0264348 A1 Aug. 18, 2022

(51) Int. Cl.
*H04W 24/10* (2009.01)
*H04B 17/345* (2015.01)
*H04W 24/08* (2009.01)

(52) U.S. Cl.
CPC .......... *H04W 24/10* (2013.01); *H04B 17/345* (2015.01); *H04W 24/08* (2013.01)

(58) Field of Classification Search
CPC .... H04W 24/10; H04W 24/08; H04B 17/345; H04B 7/0626; H04B 7/086; H04L 5/001; H04L 5/0048; H04L 5/0073; H04L 5/0094
(Continued)

(56) References Cited

U.S. PATENT DOCUMENTS

2019/0052443 A1* 2/2019 Cheng .................. H04L 5/0007
2019/0058517 A1 2/2019 Kang et al.
(Continued)

FOREIGN PATENT DOCUMENTS

CN 107889150 A 4/2018
CN 109391405 A 2/2019
(Continued)

OTHER PUBLICATIONS

Ericsson: "Csi Framework Simplification", 3GPP TSG RAN WG1 Meeting #92, R1-1803255, 3rd Generation Partnership Project, Mobile Competence Centre, 650, Route Des Lucioles, F-06921 Sophia-Antipolis Cedex, France, vol. RAN WG1, No. Athens, Greece, Feb. 26, 2018-Mar. 2, 2018 Feb. 28, 2018, XP051398509, 14 Pages, Clause 3 with Reference to Figs, 1-2 & Clause 5.2.1 with Sub-Clauses 5.2.1.1-, 5.2.1.2, 5.2.1.5.1.
(Continued)

*Primary Examiner* — Kwang B Yao
*Assistant Examiner* — Syed M Bokhari
(74) *Attorney, Agent, or Firm* — Holland & Hart LLP/QUALCOMM Incorporated

(57) ABSTRACT

Methods, systems, and devices for wireless communications are described. A base station (e.g., next-generation NodeB ((gNB)) may transmit a report configuration to a user equipment (UE). The report configuration may include a first set of quasi co-location parameters for channel measurement and a second set of quasi co-location parameters for inter-
(Continued)

ference measurement. At least one quasi co-location reference associated with a first quasi co-location parameter of the first set may be different than a quasi co-location reference associated with a second quasi co-location parameter of the second set. The quasi co-location references may include different quasi co-location Typed references that correspond to different spatial receive beams. The UE may perform the channel measurement based on a first resource setting for the channel measurement and the first set of quasi co-location parameters. The UE may perform the interference measurement based on a second resource setting for the interference measurement and the second set of quasi co-location parameters.

33 Claims, 20 Drawing Sheets

(58) Field of Classification Search
USPC .......................................................... 370/252
See application file for complete search history.

(56) References Cited

U.S. PATENT DOCUMENTS

2019/0124631 A1* 4/2019 Ren ....................... H04L 5/0048
2019/0149379 A1* 5/2019 Xiong ..................... H04L 5/006
370/329
2019/0215781 A1* 7/2019 Jeon .................... H04W 52/241
2019/0297603 A1* 9/2019 Guo ...................... H04L 5/0051
2019/0342905 A1* 11/2019 Ren ....................... H04L 1/0006
2019/0356364 A1* 11/2019 Maamari ............... H04L 5/0062
2020/0015200 A1* 1/2020 Vilaipornsawai ..... H04W 72/23
2020/0221485 A1* 7/2020 Cirik ..................... H04L 5/0048
2020/0228970 A1* 7/2020 Noh ....................... H04W 8/245
2020/0245166 A1* 7/2020 Kwak .................. H04B 7/0695

FOREIGN PATENT DOCUMENTS

WO WO-2018028549 A1 2/2018
WO WO-2018209179 A1 11/2018
WO WO-2019028765 A1 2/2019

OTHER PUBLICATIONS

Huawei et al., “CSI Measurement Enhancement for Multi-TRP/Panel Transmission”, 3GPP TSG RAN WG1 Meeting #96, R1-1903100, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 16, 2019, XP051600796, 6 Pages, Clauses 2-4.

Lenovo et al., “Discussion of Enhancement for Multi-TRP/Multi-Panel Transmission”, 3GPP TSG RAN WG 1 Meeting #94bis, R1-1810571, 3rd Generation Partnership Project, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), XP051517978, 8 Pages, chapters 1, 2, Clause 2 with Sub-Clauses 2.1-2.2.

NEC: “Discussion on Multi-TRP Transmission”, 3GPP TSG RAN WG1 #96, R1-1902689, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 15, 2019, XP051600384, Clause 2.2.

Supplementary European Search Report—EP19922587—Search Authority—Munich—Sep. 30, 2022.

International Search Report and Written Opinion—PCT/CN2019/080530—ISA/EPO—Jan. 6, 2020.

* cited by examiner

200

REPORTING CONFIGURATIONS FOR CHANNEL AND INTERFERENCE MEASUREMENT

CROSS-REFERENCE TO RELATED APPLICATIONS

The present application is a 371 national stage filing of International Patent No. PCT/CN2019/080530 by Manolakos et al., entitled "REPORTING CONFIGURATIONS FOR CHANNEL AND INTERFERENCE MEASUREMENT," filed Mar. 29, 2019, which is assigned to the assignee hereof, and which is expressly incorporated by reference in its entirety herein.

The following relates generally to wireless communications, and more specifically to reporting configurations for channel and interference measurement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations (e.g., eNodeB (eNB), next-generation NodeB ((gNB)), each simultaneously supporting communication for multiple communication devices, which may be otherwise known as user equipment (UE). In some wireless communications systems, UEs may transmit certain information to give base stations an indication of a quality or interference of a channel across which the UEs and base stations are communicating. The UEs may provide information according to a report configuration.

SUMMARY

The described techniques relate to improved methods, systems, devices, and apparatuses that support reporting configurations associated with channel and interference measurement. Generally, the described techniques provide for enabling a base station (e.g., next-generation NodeB ((gNB)) to configure a user equipment (UE) to use different quasi co-location (QCL) references, such as QCL TypeD references that correspond to different spatial receive beams, for channel measurement and interference measurement. The described techniques also provide for enabling the base station to signal (e.g., dynamically signal), to the UE, selection of QCL TypeD references for the channel measurement and the interference measurement.

A method of wireless communication at a UE is described. The method may include receiving, from a base station, a report configuration including a first set of QCL parameters for channel measurement and a second set of QCL parameters for interference measurement, where at least one QCL reference associated with a first QCL parameter of the first set is different than a QCL reference associated with a second QCL parameter of the second set, performing the channel measurement based on a first resource setting for the channel measurement and the first set of QCL parameters, performing the interference measurement based on a second resource setting for the interference measurement and the second set of QCL parameters, and transmitting, to the base station, a generated report based on the channel measurement and the interference measurement.

An apparatus for wireless communication is described. The apparatus may include a processor, memory in electronic communication with the processor, and instructions stored in the memory. The instructions may be executable by the processor to cause the apparatus to receive, from a base station, a report configuration including a first set of QCL parameters for channel measurement and a second set of QCL parameters for interference measurement, where at least one QCL reference associated with a first QCL parameter of the first set is different than a QCL reference associated with a second QCL parameter of the second set, perform the channel measurement based on a first resource setting for the channel measurement and the first set of QCL parameters, perform the interference measurement based on a second resource setting for the interference measurement and the second set of QCL parameters, and transmit, to the base station, a generated report based on the channel measurement and the interference measurement.

Another apparatus for wireless communication is described. The apparatus may include means for receiving, from a base station, a report configuration including a first set of QCL parameters for channel measurement and a second set of QCL parameters for interference measurement, where at least one QCL reference associated with a first QCL parameter of the first set is different than a QCL reference associated with a second QCL parameter of the second set, performing the channel measurement based on a first resource setting for the channel measurement and the first set of QCL parameters, performing the interference measurement based on a second resource setting for the interference measurement and the second set of QCL parameters, and transmitting, to the base station, a generated report based on the channel measurement and the interference measurement.

A non-transitory computer-readable medium storing code for wireless communication at a UE is described. The code may include instructions executable by a processor to receive, from a base station, a report configuration including a first set of QCL parameters for channel measurement and a second set of QCL parameters for interference measurement, where at least one QCL reference associated with a first QCL parameter of the first set is different than a QCL reference associated with a second QCL parameter of the second set, perform the channel measurement based on a first resource setting for the channel measurement and the first set of QCL parameters, perform the interference measurement based on a second resource setting for the interference measurement and the second set of QCL parameters, and transmit, to the base station, a generated report based on the channel measurement and the interference measurement.

Some examples of the method, apparatuses, and non-transitory computer-readable medium described herein may further include operations, features, means, or instructions for generating the report based on the channel measurement, the interference measurement, and the report configuration. In some examples of the method, apparatuses, and non-transitory computer-readable medium described herein, transmitting the generated report may be based on generating the report.

In some examples of the method, apparatuses, and non-transitory computer-readable medium described herein, the second set of QCL parameters for the interference measurement includes a subset of the first set of QCL parameters for the channel measurement.

In some examples of the method, apparatuses, and non-transitory computer-readable medium described herein, the first set of QCL parameters for the channel measurement and the second set of QCL parameters for the interference measurement corresponds to one or more spatial receive beams.

In some examples of the method, apparatuses, and non-transitory computer-readable medium described herein, the QCL reference associated with the first QCL parameter of the first set and the QCL reference associated with the second QCL parameter of the second set may include different QCL TypeD references that correspond to different spatial receive beams.

Some examples of the method, apparatuses, and non-transitory computer-readable medium described herein may further include operations, features, means, or instructions for identifying a resource for the channel measurement based on the first resource setting, measuring the channel measurement on the resource using a first spatial receive beam associated with the first QCL parameter of the first set, the first spatial receive beam having a first QCL TypeD reference, In some examples of the method, apparatuses, and non-transitory computer-readable medium described herein, performing the channel measurement may be further based on measuring the channel measurement on the resource using the first spatial receive beam.

Some examples of the method, apparatuses, and non-transitory computer-readable medium described herein may further include operations, features, means, or instructions for identifying one or more resources for the interference measurement based on the second resource setting, measuring the interference measurement on the one or more resources using a second spatial receive beam associated with the second QCL parameter of the second set, the second spatial receive beam having a second QCL TypeD reference. In some examples of the method, apparatuses, and non-transitory computer-readable medium described herein, performing the interference measurement may be further based on measuring the interference measurement on the one or more resources using the second spatial receive beam.

In some examples of the method, apparatuses, and non-transitory computer-readable medium described herein, the second spatial receive beam may be different than the first spatial receive beam.

Some examples of the method, apparatuses, and non-transitory computer-readable medium described herein may further include operations, features, means, or instructions for identifying a resource for the channel measurement based on the first resource setting, measuring the channel measurement on the resource using at least two spatial receive beams associated with the first set. In some examples of the method, apparatuses, and non-transitory computer-readable medium described herein, a first spatial receive beam of the at least two spatial receive beams corresponds to the first QCL parameter of the first set and a second spatial receive beam of the at least two spatial receive beams corresponds to an additional QCL parameter of the first set, the first spatial receive beam having a first QCL TypeD reference and the second spatial receive beam having a second QCL TypeD reference. In some examples of the method, apparatuses, and non-transitory computer-readable medium described herein, performing the channel measurement may be further based on measuring the channel measurement on the resource using the at least two spatial receive beams.

Some examples of the method, apparatuses, and non-transitory computer-readable medium described herein may further include operations, features, means, or instructions for identifying one or more resources for the interference measurement based on the second resource setting, measuring the interference measurement on the one or more resources using a third spatial receive beam associated with the second QCL parameter of the second set. In some examples of the method, apparatuses, and non-transitory computer-readable medium described herein, the third spatial receive beam includes at least one spatial receive beam of the least two spatial receive beams associated with the channel measurement, the third spatial receive beam having at least one of the first QCL TypeD reference or the second QCL TypeD reference. In some examples of the method, apparatuses, and non-transitory computer-readable medium described herein, performing the interference measurement may be further based on measuring the interference measurement on the one or more resources using the third spatial receive beam.

Some examples of the method, apparatuses, and non-transitory computer-readable medium described herein may further include operations, features, means, or instructions for receiving multiple different QCL parameter sets via higher layer signaling, where the higher layer signaling includes medium access control (MAC) control element (MAC-CE) signaling or radio resource control (RRC) signaling, or both.

Some examples of the method, apparatuses, and non-transitory computer-readable medium described herein may further include operations, features, means, or instructions for receiving control information including an indication of a selection of a QCL parameter set of the multiple different QCL parameter sets, where the selected QCL parameter set includes at least one of the first set, the second set, or a third set of QCL parameters, selecting one or more spatial receive beams for channel measurement based on the indication, measuring the channel measurement on a resource using the one or more spatial receive beams. In some examples of the method, apparatuses, and non-transitory computer-readable medium described herein, performing the channel measurement may be further based on measuring the channel measurement on the resource using the one or more spatial receive beams.

In some examples of the method, apparatuses, and non-transitory computer-readable medium described herein, receiving the control information may include operations, features, means, or instructions for receiving downlink control information (DCI) signaling.

Some examples of the method, apparatuses, and non-transitory computer-readable medium described herein may further include operations, features, means, or instructions for receiving additional control information including a second indication of a second selection of a second QCL parameter set of the multiple different QCL parameter sets, where the selected second QCL parameter set includes at least one of the first set, the second set, or the third set of QCL parameters, selecting one or more spatial receive beams for the interference measurement based on the second indication, where the one or more spatial receive beams includes at least one of the one or more spatial receive beams associated with the channel measurement, measuring the interference measurement on one or more resources using the selected one or more spatial receive beams. In some examples of the method, apparatuses, and non-transitory computer-readable medium described herein, performing the interference measurement may be further based on measuring the interference measurement on the one or more resources using the selected one or more spatial receive beams.

In some examples of the method, apparatuses, and non-transitory computer-readable medium described herein, receiving the additional control information may include operations, features, means, or instructions for receiving DCI signaling.

In some examples of the method, apparatuses, and non-transitory computer-readable medium described herein, receiving the additional control information may include operations, features, means, or instructions for receiving the additional control information via MAC-CE signaling.

In some examples of the method, apparatuses, and non-transitory computer-readable medium described herein, receiving the additional control information may include operations, features, means, or instructions for receiving the additional control information via RRC signaling.

Some examples of the method, apparatuses, and non-transitory computer-readable medium described herein may further include operations, features, means, or instructions for selecting the spatial receive beam associated with the second set includes selecting, for each resource set associated with the second resource setting for the interference measurement, a QCL parameter in the second set sequentially.

Some examples of the method, apparatuses, and non-transitory computer-readable medium described herein may further include operations, features, means, or instructions for selecting the spatial receive beam associated with the second set includes selecting, for each resource set associated with the second resource setting for the interference measurement, a QCL parameter in the second set non-sequentially.

Some examples of the method, apparatuses, and non-transitory computer-readable medium described herein may further include operations, features, means, or instructions for transmitting capability information to the base station, the capability information including a single transmission and reception point capability, a set of transmission and reception point capabilities, or a set of tracking reference signaling capabilities, or any combination thereof. In some examples of the method, apparatuses, and non-transitory computer-readable medium described herein, receiving the report configuration may be further based on the capability information.

In some examples of the method, apparatuses, and non-transitory computer-readable medium described herein, the report includes SINR information. In some examples of the method, apparatuses, and non-transitory computer-readable medium described herein, transmitting, to the base station, the report includes transmitting the SINR information.

In some examples of the method, apparatuses, and non-transitory computer-readable medium described herein, the report includes channel quality includes a channel quality indicator (CQI), a precoding matrix indicator (PMI), or a rank indicator (RI), or any combination thereof, and where transmitting, to the base station, the report includes transmitting the CQI, the PMI, or the RI, or any combination thereof.

In some examples of the method, apparatuses, and non-transitory computer-readable medium described herein, the report configuration includes a layer one SINR report setting or a CSI report setting.

In some examples of the method, apparatuses, and non-transitory computer-readable medium described herein, the report configuration includes a layer one SINR report setting and may be absent a CSI report setting.

In some examples of the method, apparatuses, and non-transitory computer-readable medium described herein, the first resource setting or the second resource setting, or both includes zero power (ZP) channel station information reference signal (CSI-RS) resources or non-zero power (NZP) CSI-RS resources, or both.

A method of wireless communication at a base station is described. The method may include configuring, for a user equipment, a report configuration including a first set of QCL parameters for channel measurement and a second set of QCL parameters for interference measurement, where at least one QCL reference associated with a first QCL parameter of the first set is different than a QCL reference associated with a second QCL parameter of the second set and transmitting the report configuration to the user equipment.

An apparatus for wireless communication is described. The apparatus may include a processor, memory in electronic communication with the processor, and instructions stored in the memory. The instructions may be executable by the processor to cause the apparatus to configure, for a user equipment, a report configuration including a first set of QCL parameters for channel measurement and a second set of QCL parameters for interference measurement, where at least one QCL reference associated with a first QCL parameter of the first set is different than a QCL reference associated with a second QCL parameter of the second set and transmit the report configuration to the user equipment.

Another apparatus for wireless communication is described. The apparatus may include means for configuring, for a user equipment, a report configuration including a first set of QCL parameters for channel measurement and a second set of QCL parameters for interference measurement, where at least one QCL reference associated with a first QCL parameter of the first set is different than a QCL reference associated with a second QCL parameter of the second set and transmitting the report configuration to the user equipment.

A non-transitory computer-readable medium storing code for wireless communication at a base station is described. The code may include instructions executable by a processor to configure, for a user equipment, a report configuration including a first set of QCL parameters for channel measurement and a second set of QCL parameters for interference measurement, where at least one QCL reference associated with a first QCL parameter of the first set is different than a QCL reference associated with a second QCL parameter of the second set and transmit the report configuration to the user equipment.

Some examples of the method, apparatuses, and non-transitory computer-readable medium described herein may further include operations, features, means, or instructions for receiving, from the user equipment, a generated report based on a channel measurement and an interference measurement by the user equipment.

In some examples of the method, apparatuses, and non-transitory computer-readable medium described herein, the second set of QCL parameters for the interference measurement includes a subset of the first set of QCL parameters for the channel measurement.

In some examples of the method, apparatuses, and non-transitory computer-readable medium described herein, the first set of QCL parameters for the channel measurement and the second set of QCL parameters for the interference measurement corresponds to one or more spatial receive beams.

In some examples of the method, apparatuses, and non-transitory computer-readable medium described herein, the QCL reference associated with the first QCL parameter of the first set and the QCL reference associated with the second QCL parameter of the second set may include operations, features, means, or instructions for different QCL TypeD references that correspond to different spatial receive beams.

Some examples of the method, apparatuses, and non-transitory computer-readable medium described herein may further include operations, features, means, or instructions for receiving, from the user equipment, capability information including a single transmission and reception point capability, a set of transmission and reception point capabilities, or a set of tracking reference signaling capabilities, or any combination thereof. In some examples of the method, apparatuses, and non-transitory computer-readable medium described herein, configuring the report configuration may be further based on the capability information.

Some examples of the method, apparatuses, and non-transitory computer-readable medium described herein may further include operations, features, means, or instructions for allocating a resource for the channel measurement, where a first resource setting includes the allocated resource for the channel measurement, and associating the first set with the allocated resource in the first resource setting.

Some examples of the method, apparatuses, and non-transitory computer-readable medium described herein may further include operations, features, means, or instructions for allocating one or more resources for the interference measurement, where a second resource setting includes the one or more allocated resources for the interference measurement, and associating the second set with the one or more allocated resources in the second resource setting.

Some examples of the method, apparatuses, and non-transitory computer-readable medium described herein may further include operations, features, means, or instructions for transmitting control information including an indication of at least one of the first QCL parameter of the first set or a subset of QCL parameters of the first set.

In some examples of the method, apparatuses, and non-transitory computer-readable medium described herein, transmitting the control information may include operations, features, means, or instructions for transmitting DCI signaling.

Some examples of the method, apparatuses, and non-transitory computer-readable medium described herein may further include operations, features, means, or instructions for transmitting additional control information including a second indication of at least one of the second QCL parameter of the second set or a subset of QCL parameters of the first set.

In some examples of the method, apparatuses, and non-transitory computer-readable medium described herein, transmitting the additional control information may include operations, features, means, or instructions for transmitting DCI signaling.

In some examples of the method, apparatuses, and non-transitory computer-readable medium described herein, transmitting the additional control information may include operations, features, means, or instructions for transmitting the additional control information via MAC-CE signaling.

In some examples of the method, apparatuses, and non-transitory computer-readable medium described herein, transmitting the additional control information may include operations, features, means, or instructions for transmitting the additional control information via RRC signaling.

In some examples of the method, apparatuses, and non-transitory computer-readable medium described herein, the first resource setting or the second resource setting, or both includes ZP CSI-RS resources or NZP CSI-RS resources, or both.

Some examples of the method, apparatuses, and non-transitory computer-readable medium described herein may further include operations, features, means, or instructions for transmitting multiple different QCL parameter sets via higher layer signaling, where the higher layer signaling includes MAC-CE signaling or RRC signaling, or both.

DETAILED DESCRIPTION

A base station (e.g., next-generation NodeB ((gNB)) may configure user equipments (UEs) to use different quasi co-location (QCL) references, such as QCL TypeD references that correspond to different spatial receive beams, for channel measurement and interference measurement. A QCL reference may be a reference resource identifier, for example, such as a synchronization signal block (SSB) identifier, a channel state information reference signal (CSIRS) identifier, or the like. The reference resource identifier may be configured as a reference of a specific QCL parameter (e.g., QCL Type A, B, C, D) for a target reference signal (e.g., CSIRS for channel measurement or interference measurement). By way of example, UEs may receive, from base stations, a report configuration including a first set of QCL parameters for channel measurement and a second set of QCL parameters for interference measurement. In some examples, at least one QCL reference associated with a first QCL parameter of the first set may be different than a QCL reference associated with a second QCL parameter of the second set. The second set of QCL parameters for the interference measurement may, in some cases, be a subset of the first set of QCL parameters for the channel measurement.

For instance, the second set of QCL parameters for the interference measurement may be one of the first set of QCL parameters (which may include multiple QCL parameters) for the channel measurement. In some examples, base stations may dynamically signal, to UEs, selection of QCL TypeD references for the channel measurement and the interference measurement. UEs may perform the channel measurement based on a first resource setting for the channel measurement and the first set of QCL parameters, and perform the interference measurement based on a second resource setting for the interference measurement and the second set of QCL parameters. UEs may then generate a report according to the channel measurement, the interference measurement, or the report configuration, or a combination thereof.

Aspects of the disclosure are initially described in the context of a wireless communications system. Aspects of the disclosure are then illustrated by and described with reference to reporting schemes and process flows that relate to reporting configurations for channel and interference measurement. Aspects of the disclosure are further illustrated by and described with reference to apparatus diagrams, system diagrams, and flowcharts that relate to reporting configurations for channel and interference measurement.

Figure 1:
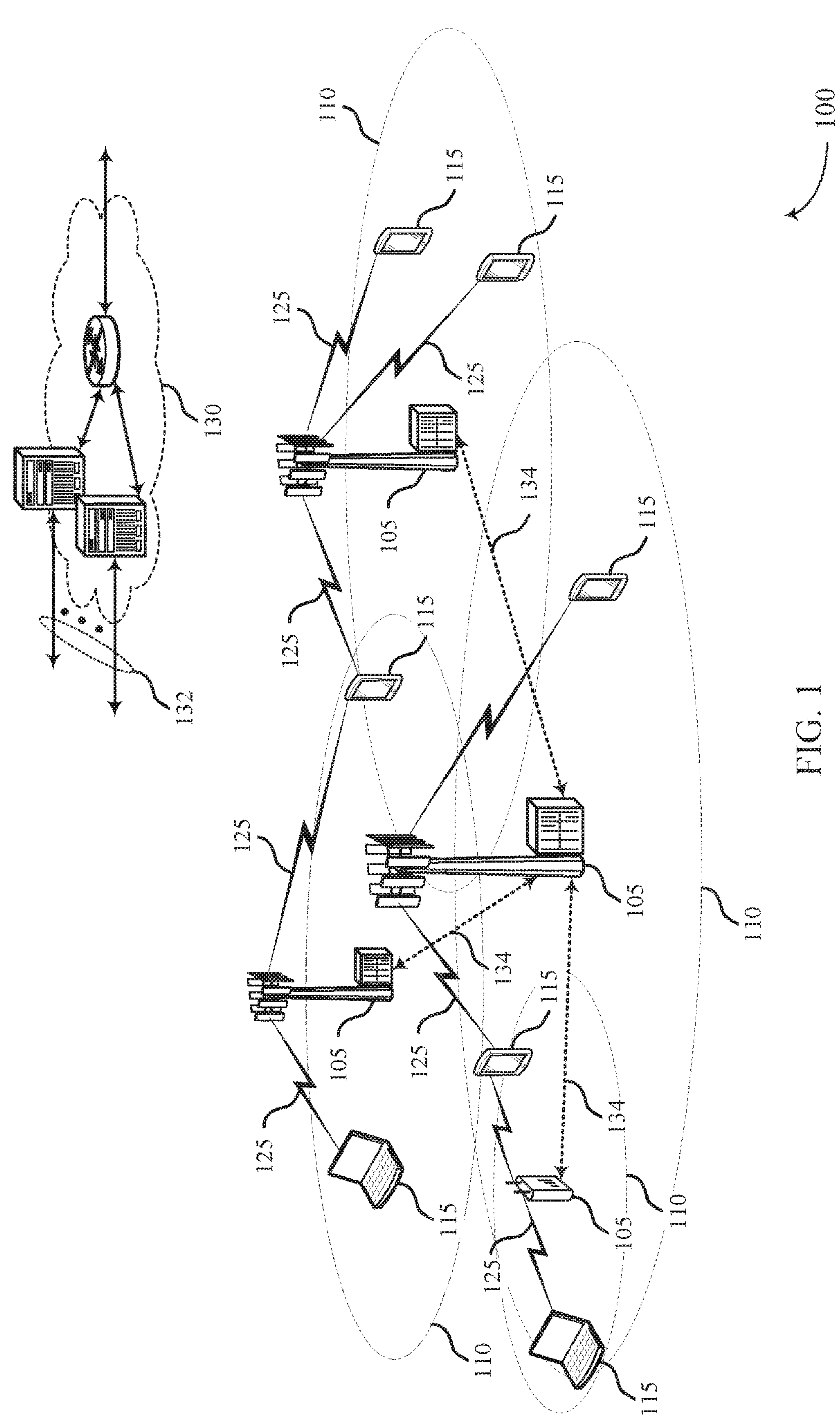
FIGS. 1 and 2 illustrate examples of a wireless communications system that supports reporting configurations for channel and interference measurement in accordance with aspects of the present disclosure.

FIG. 1 illustrates an example of a wireless communications system 100 that supports reporting configurations for channel and interference measurement in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Wireless communications system 100 may support reporting configurations for and communication related to channel and interference measurement. Generally, wireless communications system 100 may enable base stations 105 to configure UEs to use different QCL TypeD references that correspond to different spatial receive beams for channel measurement and interference measurement. Wireless communications system 100 may enable base stations 105 to signal, for example dynamically signal (e.g., DCI signaling, MAC-CE signaling, RRC signaling), to one or more UEs 115, selection of QCL TypeD references for the channel measurement and the interference measurement.

By way of example, UEs 115 may receive, from base stations 105, a report configuration including a first set of QCL parameters for channel measurement and a second set of QCL parameters for interference measurement. In some examples, at least one QCL reference associated with a first QCL parameter of the first set is different than a QCL reference associated with a second QCL parameter of the second set. The second set of QCL parameters for the interference measurement may be a subset of the first set of QCL parameters for the channel measurement or may be different than the first set of QCL parameters for the channel measurement. In some other examples, the QCL reference associated with the first QCL parameter of the first set and the QCL reference associated with the second QCL parameter of the second set may include different QCL TypeD references that correspond to different spatial receive beams.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term “carrier” refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
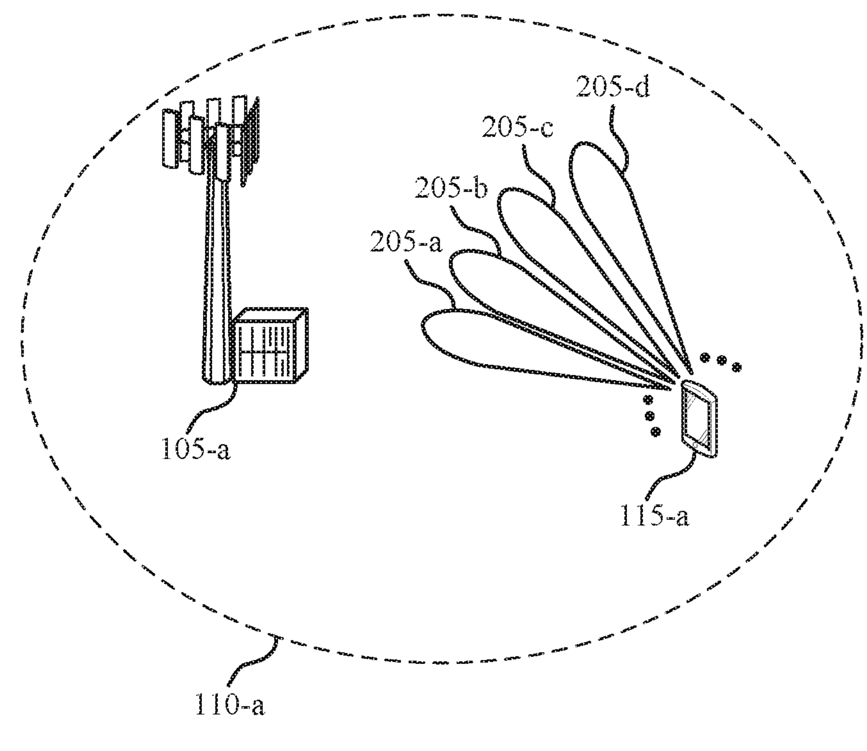

FIG. 2 illustrates an example of a wireless communications system 200 that supports reporting configurations for channel and interference measurement in accordance with aspects of the present disclosure. Wireless communications system 200 may include base station 105-*a* and UE 115-*a*, which may be examples of the corresponding devices described with reference to FIG. 1. In some examples, wireless communications system 200 may implement aspects of wireless communications system 100. For example, base station 105-*a* and UE 115-*a* may support improvements for channel state information (CSI) reporting or layer 1 (L1) signal to interference and noise ratio (L1-SINR) reporting.

Base station 105-*a* may configure UE 115-*a* with one or more reporting configurations. In some examples, one or more of the reporting configurations may correspond to a report setting. A report setting may provide information to UE 115-*a* on what information to report to base station 105-*a* and how often to report the information to base stations 105-*a*. For example, a report setting may include a layer 1 (L1) reference signal received power (L1-RSRP) report setting, a CSI report setting, or an L1-SINR report setting, or any combination thereof. In some examples, the L1-SINR report setting may be possible, but not the CSI report setting. By way of example, for the L1-RSRP report setting, UE 115-*a* may report a signal strength of one or more reference signals, while for the CSI report setting and the SINR report setting, UE 115-*a* may report a channel quality, which may include at least one of interference information (e.g., SINR information), a CQI, a PMI, or an RI, or any combination thereof.

One or more of the example report settings outlined above may correspond to one or more resource settings. A resource setting may provide resource information, such as time and frequency resources, for example, allocation of certain symbols, slots, subcarriers that UE 115-*a* may perform measurements on and transmit a report related to the measurements. An L1-RSRP report setting may include at least one resource setting, while a CSI report setting or SINR report setting may relate to two or more resource settings. For the L1-RSRP report setting, UE 115-*a* may have a single resource setting for channel measurement. That is, UE 115-*a* may only perform a channel measurement for the L1-RSRP report setting because UE 115-*a* may only be able to measure a reference signal received power. In other words, for the L1-RSRP report setting, there is no noise for UE 115-*a* to measure. Alternatively, for the CSI report setting and the L1-SINR report setting, UE 115-*a* may have one resource setting for channel measurement and a second resource setting for interference measurement.

A resource setting may, in some examples, include zero power channel state information-reference signal (ZP CSI-RS) resources, or non-zero power channel state information-reference signal (NZP CSI-RS) resources (also referred to as channel state information-interference management (CSI-IM) resources), or both. In some examples, base station 105-*a* may configure one resource setting to include ZP CSI-RS resources for channel measurement, a second resource setting to include NZP CSI-RS resources for interference measurement, and a third resource setting to include resources for interference measurement from other neighboring cells (e.g., base stations or UEs in other neighboring cells). Alternatively, base station 105-*a* may configure the second resource setting to include ZP CSI-RS resources for interference measurement. In some other examples, base station 105-*a* may configure a resource setting to include dedicated ZP IM resources or dedicated NZP IM resources, or both for UE 115-*a* to perform measurements on for the L1-SINR report setting.

A resource setting may include one or more resources, such as time and frequency resources. In some examples, a resource setting for channel measurement may include a single resource set, while a resource setting for interference measurement may include one or more resource sets. For example, base station 105-*a* may configure UE 115-*a* with an NZP CSI-RS resource for channel measurement, as well as one or more NZP CSI-RS resources or ZP CSI-RS resources for interference measurement. In some examples, if UE 115-*a* performs interference measurement on NZP CSI-RS resources, UE 115-*a* may not expect to be configured by base station 105-*a* with more than one NZP CSI-RS resource in the single resource setting for channel measurement.

Base stations 105-*a* may inform UE 115-*a* of the channel on which UE 115-*a* and base station 105-*a* perform wireless communications, and UE 115-*a* may perform channel measurements and interference measurements of the channel on one or more resources according to the resource setting. UE 115-*a* may then determine a channel quality based in part on the channel measurement and the interference measurement. Here, UE 115-*a* may use the channel quality to determine at least one of a CQI, PMI, or RI, or any combination thereof. Accordingly, base station 105-*a* may configure one or more resource settings and associate the one or more resource settings with a report setting. According to a report setting, UE 115-*a* may then perform a measurement (e.g., a channel measurement, an interference measurement) on one or more resources associated with the one or more resource settings, and report certain information (e.g., a CQI, PMI, RI, or any combination thereof) to base station 105-*a*.

In some examples, each resource setting may correspond to a QCL parameter. The QCL parameter may have a QCL TypeD reference that may correspond to a spatial receive beam 205 of UE 115-*a*. In some examples, each resource setting may relate to a QCL parameter that has a QCL TypeD reference (i.e., a same spatial receive beam 205). In some other examples, UE 115-*a* may determine that NZP-RS resources for channel measurement and ZP-RS resource for interference measurement are resource-wise QCL'd with respect to the QCL TypeD reference. In other examples, when NZP CSI-RS resource are used for interference measurement, UE 115-*a* may determine that the NZP CSI-RS resources for channel measurement and the ZP-RS resources and/or NZP CSI-RS resources for interference measurement configured for the CSI report setting are QCL'd with respect to QCL TypeD reference. In some examples, each resource setting may relate to a QCL parameter that has a same QCL TypeD reference (i.e., a same spatial receive beam 205). For example, UE 115-*a* may use a same spatial receive beam 205 for channel measurement and interference measurement.

Base station 105-*a* may, in some examples, configure UE 115-*a* to support using different QCL TypeD references (e.g., different spatial receive beams 205) for channel measurement and interference measurement for at least the CSI report setting or the L1-SINR report setting, or both. For example, UE 115-*a* may support using different QCL TypeD references when base station 105-*a* configures UE 115-*a* to use the L1-SINR report setting or the CSI report setting, or both. In some other examples, UE 115-*a* may provide capability information to the base station 105-*a*. Here, base station 105-*a* may use the capability information to configure UE 115-*a* to support using different QCL TypeD references (e.g., different spatial receive beams 205) for channel measurement and interference measurement for at least the CSI report setting or the L1-SINR report setting, or both. For example, the capability information may include a single transmission and reception point (TRP) capability, capabilities related to multiple-TRPs, or capabilities of tracking simultaneously more than one reference signals in a component carrier, capabilities of tracking simultaneously more than one QCL TypeD reference for spatial receive beams 205, or any combination thereof.

It may be advantageous for UE 115-*a* to support different QCL TypeD references for one or more resources associated with channel measurement and interference measurement. That is, it may be advantageous for UE 115-*a* to use different spatial receive beams 205 for channel measurement and interference measurement. For example, UE 115-*a* may use spatial receive beams 205-*a* on NZP CSI-RS for channel measurement and spatial receive beam 205-*b*, 205-*c* on NZP CSI-RS for interference measurement. By using different spatial receive beams 205 for channel measurement and interference measurement, UE 115-*a* may improve its accuracy in measuring channel quality and interference (e.g., SINR).

As a result, UE 115-*a* may perform channel measurement and interference measurement based in part on one or more resource settings and one or more QCL parameters, generate a report based in part on the measurements, and transmit the report to base station 105-*a* according to the reporting configuration. In some examples, UE 115-*a* may store a list or table of different reporting configurations and QCL assumptions for one or more resources for interference measurement. Here, base station 105-*a* may trigger and UE 115-*a* may select one of the reporting configurations and QCL assumptions in the list or table based in part on an indication signaled via control signaling (e.g., DCI signaling).

Figure 3:
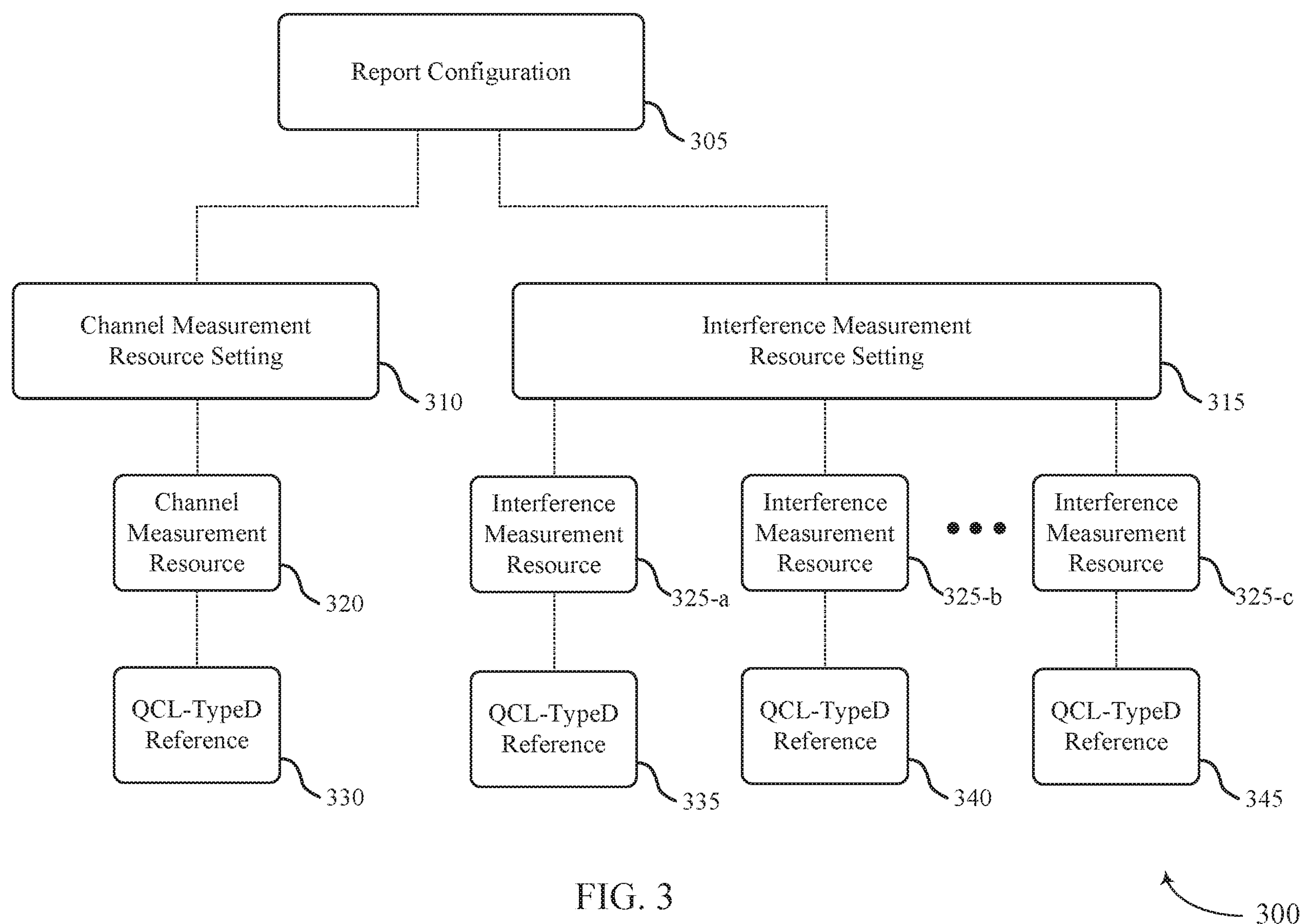
FIGS. 3 through 5 illustrate examples of a reporting scheme that supports reporting configurations for channel and interference measurement in accordance with aspects of the present disclosure.

FIG. 3 illustrates an example of a reporting scheme 300 that supports reporting configurations for channel and interference measurement in accordance with aspects of the present disclosure. Reporting scheme 300 may support a report configuration 305, which may include a CSI report setting or an L1-SINR report setting, or both. In some examples, with reference to FIG. 2, base station 105-*a* may configure UE 115-*a* with report configuration 305. Report configuration 305 may relate to one or more resource settings. For example, report configuration 305 may correspond to a resource setting 310 for channel measurement and a resource setting 315 for interference measurement. In some examples, resource setting 310 may include NZP CSI-RS resources for channel measurement, while resource setting 315 may include ZP CSI-RS resources or NZP CSI-RS resources, or both for interference measurement. In some other examples, resource setting 310 may include a single resource set 320 for channel measurement that may include NZP CSI-RS resources, while resource setting 315 may include one or more resource sets 325 that may include NZP CSI-RS resources.

In the example of FIG. 3, resource set 320 for channel measurement and each resource set 325 for interference measurement may have a different QCL TypeD reference. For example, resource set 320 may have a first QCL TypeD reference 330, resource set 325-*a* may have a second QCL TypeD reference 335, resource set 325-*b* may have a third QCL TypeD reference 340, and resource set 325-*c* may have a fourth QCL TypeD reference 345. One or more of the QCL TypeD references in FIG. 3 may correspond to one or more of the spatial receive beams 205 in FIG. 2. For example, the first QCL TypeD reference 330 may correspond to spatial receive beam 205-*a*, the second QCL TypeD reference 335 may correspond to spatial receive beam 205-*b*, the third QCL TypeD reference 340 may correspond to spatial receive beam 205-*c*, and so forth.

Accordingly, with reference to FIG. 2, UE 115-*a* may perform channel measurement on resource set 320 (e.g., NZP CSI-RS resources) using spatial receive beam 205-*a*, and perform interference measurements on resource sets 325-*a* through 325-*c* (e.g., NZP CSI-RS resources) using spatial receive beams 205-*b* through 205-*d*. UE 115-*a* may then generate a report including interference information (e.g., SINR of a channel) or channel quality information, such as a CQI, a PMI, or an RI, or any combination thereof, and transmit the report to base station 105-*a* according to the report configuration 305, the channel measurement, and the interference measurement.

Figure 4:
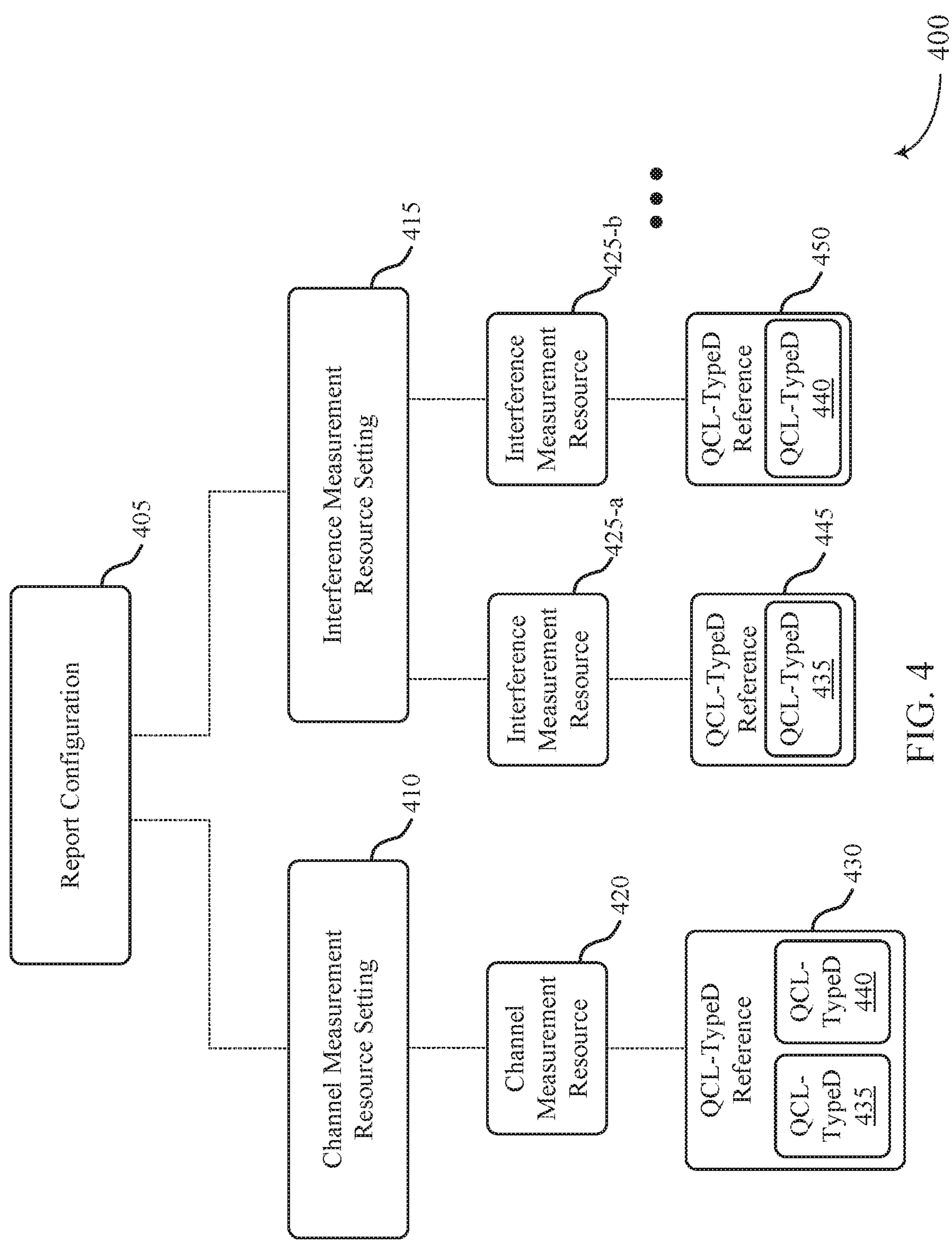

FIG. 4 illustrates an example of a reporting scheme 400 that supports reporting configurations for channel and interference measurement in accordance with aspects of the present disclosure. Reporting scheme 400 may support a report configuration 405, which may include a CSI report setting or an L1-SINR report setting, or both. In some examples, with reference to FIG. 2, base station 105-*a* may configure UE 115-*a* with report configuration 405. Report configuration 405 may relate to one or more resource settings. For example, report configuration 405 may correspond to a resource setting 410 for channel measurement and a resource setting 415 for interference measurement. In some examples, resource setting 410 may include NZP CSI-RS resources for channel measurement, while resource setting 415 may also include NZP CSI-RS resources for interference measurement. In some other examples, resource setting 410 may include a single resource set 420 for channel measurement that may include NZP CSI-RS resources, while resource setting 415 may include one or more resource sets 425 that may include NZP CSI-RS resources.

In the example of FIG. 4, resource set 420 for channel measurement may have two or more different QCL TypeD references. For example, resource set 420 may have a first QCL TypeD reference 435 and a second QCL TypeD reference 440. In some examples, with reference to FIG. 2, the first QCL TypeD reference 435 may correspond to spatial receive beam 205-*a*, while the second QCL TypeD reference 440 may correspond to spatial receive beam 205-*b*. Therefore, UE 115-*a* may receive a channel on two different spatial receive beams. Reception of the channel on two different spatial receive beams may be referred to as a TCI codepoint.

Resource sets 425 for interference measurement may, in some examples, have a QCL TypeD reference associated with resource set 420. That is, resource sets 425 for interference measurement may use a subset of the QCL TypeD references associated with resource set 420. In some examples, this may occur when resource set 420 has more than a single QCL TypeD reference (e.g., when UE 115-*a* has multi-TRPs). Therefore, each resource set 425 for interference measurement may have at least one QCL TypeD reference associated with resource set 420. By way of example, resource set 425-*a* may have the first QCL TypeD reference 435 corresponding to spatial receive beam 205-*a* and resource set 425-*b* may have the second QCL TypeD reference 440 corresponding to spatial receive beam 205-*b*. Alternatively, resource set 425-*a* may have the second QCL TypeD reference 440 corresponding to spatial receive beam 205-*b*, while resource set 425-*b* may have the first QCL TypeD reference 435 corresponding to spatial receive beam 205-*a*.

Accordingly, with reference to FIG. 2, UE 115-*a* may perform channel measurement on resource set 420 (e.g., NZP CSI-RS resources) using at least two spatial receive beams 205, and perform interference measurements on resource sets 425-*a*, 425-*b* (e.g., NZP CSI-RS resources) using the at least two spatial receive beams 205. That is, UE 115-*a* may use at least one spatial receive beam 205 of the at least two spatial receive beams associated with the channel measurement for each resource set 425 for the interference measurement. UE 115-*a* may then generate a report including interference information (e.g., SINR of a channel) or channel quality information, such as a CQI, a PMI, or an RI, or any combination thereof, and transmit the report to base station 105-*a* according to the report configuration 405.

Figure 5:
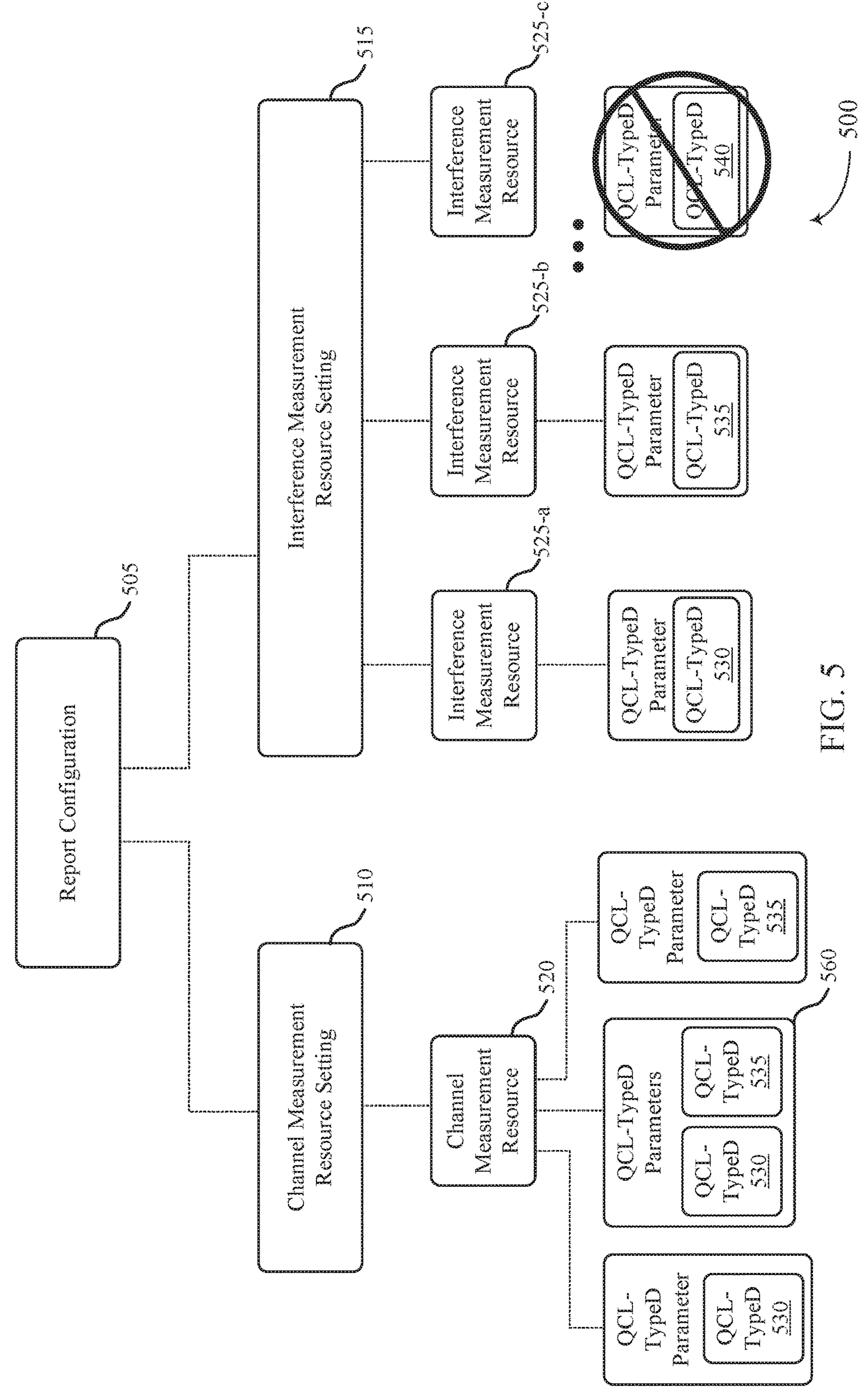

FIG. 5 illustrates an example of a reporting scheme 500 that supports reporting configurations for channel and interference measurement in accordance with aspects of the present disclosure. Reporting scheme 500 may support a report configuration 505, which may include a CSI report setting or an L1-SINR report setting, or both. In some examples, with reference to FIG. 2, base station 105-*a* may configure UE 115-*a* with report configuration 505. Report configuration 505 may relate to one or more resource settings. For example, report configuration 505 may correspond to a resource setting 510 for channel measurement and a resource setting 515 for interference measurement. In some examples, resource setting 510 may include NZP CSI-RS resources for channel measurement, while resource setting 515 may also include NZP CSI-RS resources for interference measurement. In some other examples, resource setting 510 may include a single resource set 520 for channel measurement that may include NZP CSI-RS resources, while resource setting 515 may include one or more resource sets 525 that may include NZP CSI-RS resources.

Resource set 520 for channel measurement may have different QCL TypeD references. In some examples, UE 115-*a* may be configured with multiple different QCL TypeD reference sets, such as a first QCL TypeD reference 530, a second QCL TypeD reference 535, or a set 560 that may include first QCL TypeD reference 530 and the second QCL TypeD reference 535. UE 115-*a* may be configured with the multiple different QCL TypeD reference sets via higher layer signaling (e.g., RRC signaling, MAC-CE signaling). By way of example, resource set 520 may be configured with the first QCL TypeD reference 530 or the second QCL TypeD reference 535. In some examples, with reference to FIG. 2, the first QCL TypeD reference 530 may correspond to spatial receive beam 205-*a*, while the second QCL TypeD reference 535 may correspond to spatial receive beam 205-*b*. In some other examples, resource set 520 for channel measurement may be configured with the set 560 including two or more different QCL TypeD references. For example, the set 560 may include first QCL TypeD reference 530 and the second QCL TypeD reference 535. In this example, UE 115-*a* may receive a channel on two different spatial receive beams (e.g., spatial receive beam 205-*a* and spatial receive beam 205-*b*). Accordingly, MAC-CE layer signaling my selection a QCL TypeD reference of NZP CSI-RS IM resources, and RRC layer signaling may associate NZP CSI-RS IM resources with QCL TypeD references. The RRC layer signaling of the report configuration 505 (e.g., CSI report configuration) may include an association of NZP CSI-RS IM resources and QCL TypeD references.

In the example of FIG. 5, and with reference to FIG. 2, base station 105-*a* may select a QCL TypeD reference for UE 115-*a* to use for channel measurement based on control signaling. In an example, base station 105-*a* may transmit DCI signaling. In other examples, the control signaling may include higher layer signaling (e.g., RRC signaling, MAC-CE signaling). In the example of multiple QCL TypeD references, base station 105-*a* may provide an indication of a selected QCL TypeD reference via a bit indication in the DCI signaling.

In some examples, the bit indication may indicate for UE 115-*a* to use the first QCL TypeD reference 530 or the second QCL TypeD reference 535. Additionally, or alternatively, the bit indication may indicate for UE 115-*a* to use the set 560 including both the first QCL TypeD reference 530 and the second QCL TypeD reference 535. As a result, UE 115-*a* may select one or more spatial receive beams based in part on the control signaling, and measure the channel measurement on the one or more spatial receive beams corresponding to QCL TypeD references.

Resource sets 525 for interference measurement may, in some examples, have a QCL TypeD reference associated with resource set 520. That is, resource sets 525 for interference measurement may use a QCL TypeD references dynamically signaled for resource set 520. In other words, QCL TypeD references associated with resource sets 525 would not include other QCL TypeD references not associated with resource set 520. For example, resource set 525-*c* may not be configured with a QCL TypeD reference 540, which is not one of the QCL TypeD references of resource set 520 for channel measurement.

Base station 105-*a* may similarly select a QCL TypeD reference for UE 115-*a* to use for interference measurement based on additional control signaling. In some examples, base station 105-*a* may trigger QCL TypeD reference for UE 115-*a* to use for interference measurement in the same control signaling used for the channel measurement. In an example, base station 105-*a* may also transmit DCI signaling. The additional control signaling may include higher layer signaling (e.g., RRC signaling, MACE-CE signaling). In the example of multiple QCL TypeD references, base station 105-*a* may provide an indication of a selected QCL TypeD reference via a bit indication in the DCI signaling.

In some examples, the bit indication may indicate for UE 115-*a* to use the first QCL TypeD reference 530 for resource set 525-*a* and the second QCL TypeD reference 535 for resource set 525-*b*. Additionally, or alternatively, the bit indication may indicate for UE 115-*a* to use the set 560 including both the first QCL TypeD reference 530 and the second QCL TypeD reference 535 for resource set 525-*c*. As a result, UE 115-*a* may select one or more spatial receive beams based on the control signaling, and measure the channel measurement on the one or more spatial receive beams corresponding to QCL TypeD references.

In some examples, in response to the additional control signaling, base station 105-*a* or UE 115-*a* may select a QCL TypeD reference for UE 115-*a* to use for interference measurement based in part on a predefined sequence. For example, resource set 525-*a* may be configured with the first QCL TypeD reference 530, resource set 525-*b* may be configured with the second QCL TypeD reference 535, and resource set 525-*c* may be configured with the set 560 including both the first QCL TypeD reference 530 and the second QCL TypeD reference 535. Here, the predefined sequence of QCL TypeD reference configuration for each resource set 525 may be based in part on a sequence order (e.g., in "a round-robin fashion").

Alternatively, the predefined sequence of QCL TypeD reference configuration for each resource set 525 may be based in part on a non-sequence order. For example, resource set 525-*a* may be configured with the second QCL TypeD reference 535, resource set 525-*b* may be configured with the set 560 including both the first QCL TypeD reference 530 and the second QCL TypeD reference 535, and resource set 525-*c* may be configured with the second QCL TypeD reference 535.

Returning to FIG. 2, in some examples, base station 105-*a* may configure UE 115-*a* with multiple reporting configurations associated with different options for QCL assumption, and base station 105-*a* may select an option based on an indication (e.g., bit indication) in control signaling.

Figure 6:
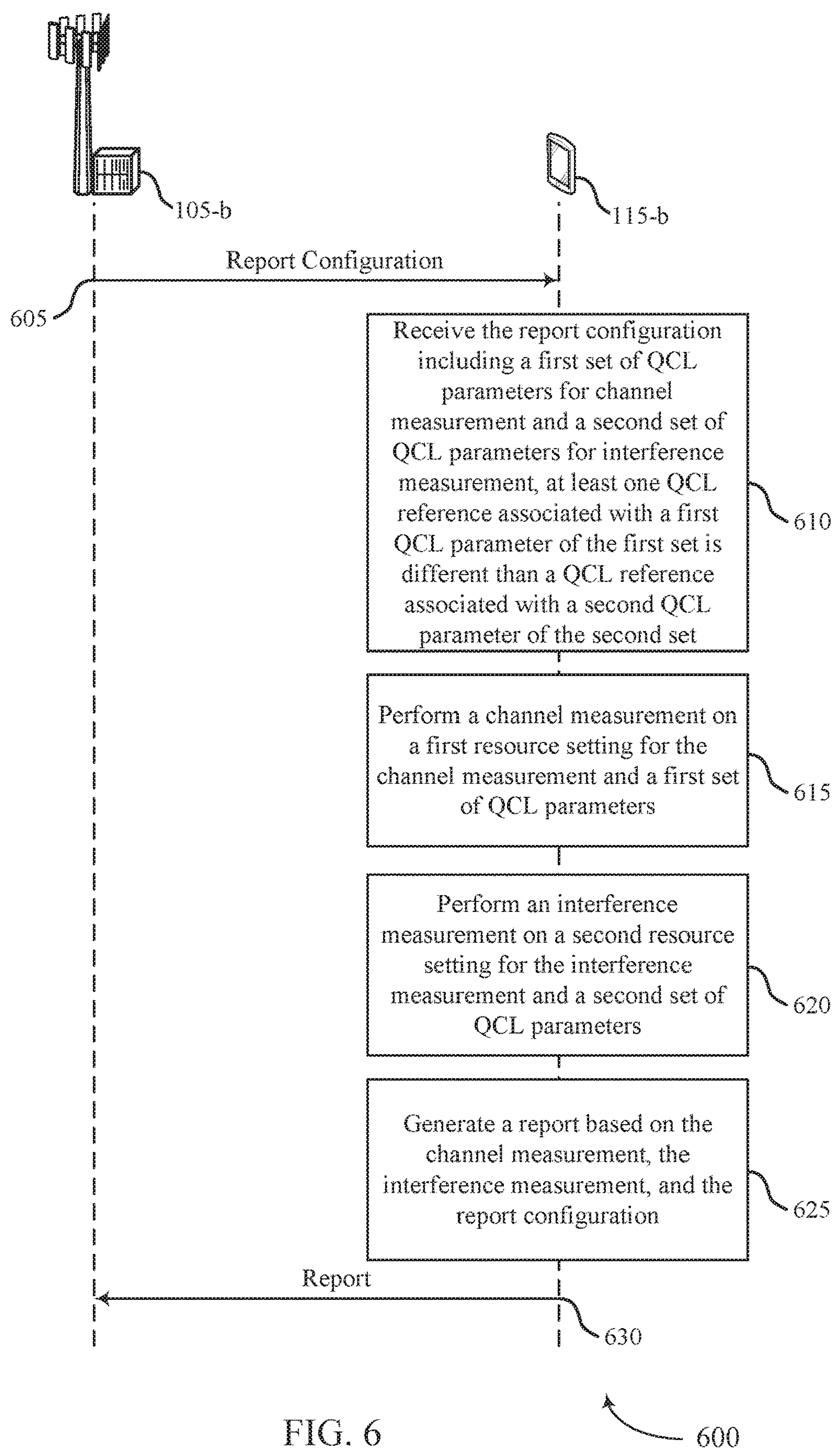
FIG. 6 illustrates an example of a process flow that supports reporting configurations for channel and interference measurement in accordance with aspects of the present disclosure.

FIG. 6 illustrates an example of a process flow 600 that supports reporting configurations for channel and interference measurement in accordance with aspects of the present disclosure. The process flow 600 may implement aspects of wireless communications systems 100 and 200, such as providing improvements to CSI reporting and L1-SINR reporting. The process flow 600 may include base station 105-*b* and UE 115-*b*, which may be examples of the corresponding devices described with reference to FIGS. 1 and 2.

In the following description of the process flow 600, the operations between base station 105-*b* and UE 115-*b* may be transmitted in a different order than the exemplary order shown, or the operations performed by base station 105-*b* and UE 115-*b* may be performed in different orders or at different times. Certain operations may also be omitted from the process flow 600, and/or other operations may be added to the process flow 600.

At 605, base station 105-*b* may transmit a report configuration to UE 115-*b*. The report configuration may be include an L1-SINR report setting or a CSI report setting, or both. In some examples, base station 105-*b* may configure UE 115-*b* with a report configuration that may include a first set of QCL parameters for channel measurement and a second set of QCL parameters for interference measurement. the first set of QCL parameters for the channel measurement and the second set of QCL parameters for the interference measurement may correspond to one or more spatial receive beams associated with UE 115-*b*.

In other examples, the second set of QCL parameters for the interference measurement include a subset of the first set of QCL parameters for the channel measurement. In some other examples, at least one QCL reference associated with a first QCL parameter of the first set is different than a QCL reference associated with a second QCL parameter of the second set. For example, the QCL reference associated with the first QCL parameter of the first set and the QCL reference associated with the second QCL parameter of the second set may include different QCL TypeD references that correspond to different spatial receive beams.

At 610, UE 115-*b* may receive the report configuration including a first set of QCL parameters for channel measurement and a second set of QCL parameters for interference measurement, at least one QCL reference associated with a first QCL parameter of the first set is different than a QCL reference associated with a second QCL parameter of the second set.

At 615, UE 115-*b* may perform a channel measurement on a first resource setting for the channel measurement and a first set of QCL parameters. In some examples, UE 115-*b* may identify a resource for the channel measurement based on the first resource setting and measure the channel measurement on the resource using a first spatial receive beam associated with the first QCL parameter of the first set. The first spatial receive beam may have a first QCL TypeD reference. In some other examples, UE 115-*b* may measure the channel measurement on the resource using at least two spatial receive beams associated with the first set. Here, a first spatial receive beam of the at least two spatial receive beams corresponds to the first QCL parameter of the first set and a second spatial receive beam of the at least two spatial receive beams corresponds to an additional QCL parameter of the first set. The first spatial receive beam may have a first QCL TypeD reference and the second spatial receive beam may have a second QCL TypeD reference.

At 620, UE 115-*b* may perform an interference measurement on a second resource setting for the interference measurement and a second set of QCL parameters. In some examples, UE 115-*b* may identify one or more resources for the interference measurement based on the second resource setting and measure the interference measurement on the one or more resources using a second spatial receive beam associated with the second QCL parameter of the second set. the second spatial receive beam may have a second QCL TypeD reference.

In these examples, the second spatial receive beam may be different than the first spatial receive beam. In some other examples, UE 115-*b* may measure the interference measurement on the one or more resources using a third spatial receive beam associated with the second QCL parameter of the second set. The third spatial receive beam may be at least one spatial receive beam of the least two spatial receive beams associated with the channel measurement. The third spatial receive beam therefore may have at least one of the first QCL TypeD reference or the second QCL TypeD reference.

In other examples, base station 105-*b* may transmit multiple different QCL parameter sets (e.g., $S_1$: {QCL TypeD reference 1}, $S_2$:{QCL TypeD reference 1, QCL TypeD reference 2}, $S_3$: {QCL TypeD reference 2}, etc.) to UE 115-*b*. Here, base station 105-*b* may trigger a QCL parameter set in the multiple different QCL parameter sets based on control signaling. For example, UE 115-*b* may receive control information including an indication of a selection of a QCL parameter set (e.g., $S_1$: {QCL TypeD reference 1}) of the multiple different QCL parameter sets (e.g., $S_1$:{QCL TypeD reference 1}, $S_2$: {QCL TypeD reference 1, QCL TypeD reference 2}, $S_3$:{QCL TypeD reference 2}) for the channel measurement via at least one of DCI signaling, RRC signaling, or MAC-CE signaling.

In some examples, the indication may be a one or more bit indication. UE 115-*b* may then select one or more spatial receive beams for channel measurement based on the indication. In some other examples, UE 115-*b* may receive additional control information including an additional indication of a selection of a QCL parameter set (e.g., $S_3$: {QCL TypeD reference 2}) of the multiple different QCL parameter sets (e.g., $S_1$: {QCL TypeD reference 1}, $S_2$:{QCL TypeD reference 1, QCL TypeD reference 2}, $S_3$: {QCL TypeD reference 2}) for the interference measurement via at least one of DCI signaling, RRC signaling, or MAC-CE signaling. Similarly, UE 115-*b* may then select one or more spatial receive beams for the interference measurement based on the additional indication. Here, UE 115-*b* may select spatial receive beams associated with the channel measurement. That is, UE 115-*b* may be unable to select spatial receive beams that are outside of the different QCL parameter sets.

At 625, UE 115-*b* may generate a report based on the channel measurement, the interference measurement, and the report configuration. In some examples, the report may include SINR information, CQI, PMI, RI, or any combination thereof. At 630, UE 115-*b* may transit the report to base station 105-*b*.

The operations performed by base station 105-*b* and UE 115-*b* as part of, but not limited to, process flow 600 may provide improvements to CSI reporting and L1-SINR reporting. Furthermore, the operations performed by base station 105-*b* and UE 115-*b* as part of, but not limited to, process flow 600 may provide benefits and enhancements to the operation of UE 115-*b*. For example, by supporting different QCL TypeD references for one or more resources associated with channel and interference measurement, the operational characteristics, such as power consumption, processor utilization, and memory usage related to channel and interference measurement may be reduced. The operations performed by UE 115-*b* as part of, but not limited to, process flow 600 may also provide efficiency to UE 115-*b* by increasing precision associated with processes related to channel and interference measurement.

Figure 7:
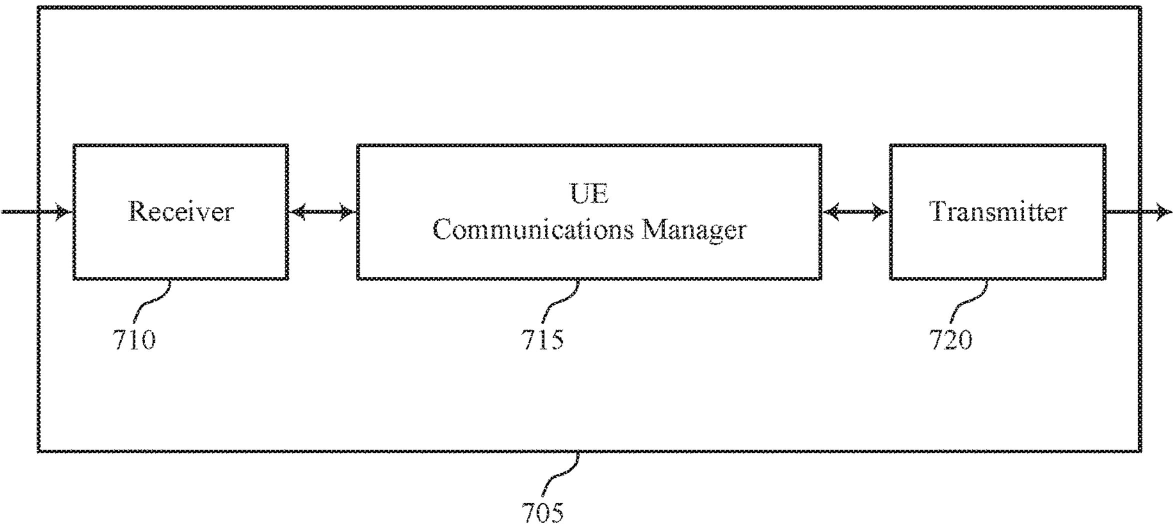
FIGS. 7 and 8 show block diagrams of devices that support reporting configurations for channel and interference measurement in accordance with aspects of the present disclosure.

FIG. 7 shows a block diagram 700 of a device 705 that supports reporting configurations for channel and interference measurement in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to reporting configurations for channel and interference measurement, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may receive, from a base station 105, a report configuration including a first set of QCL parameters for channel measurement and a second set of QCL parameters for interference measurement, where at least one QCL reference associated with a first QCL parameter of the first set is different than a QCL reference associated with a second QCL parameter of the second set, perform the channel measurement based on a first resource setting for the channel measurement and the first set of QCL parameters, perform the interference measurement based on a second resource setting for the interference measurement and the second set of QCL parameters, and transmit, to the base station 105, a generated report based on the channel measurement and the interference measurement. The UE communications manager 715 may be an example of aspects of the UE communications manager 1010 described herein.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
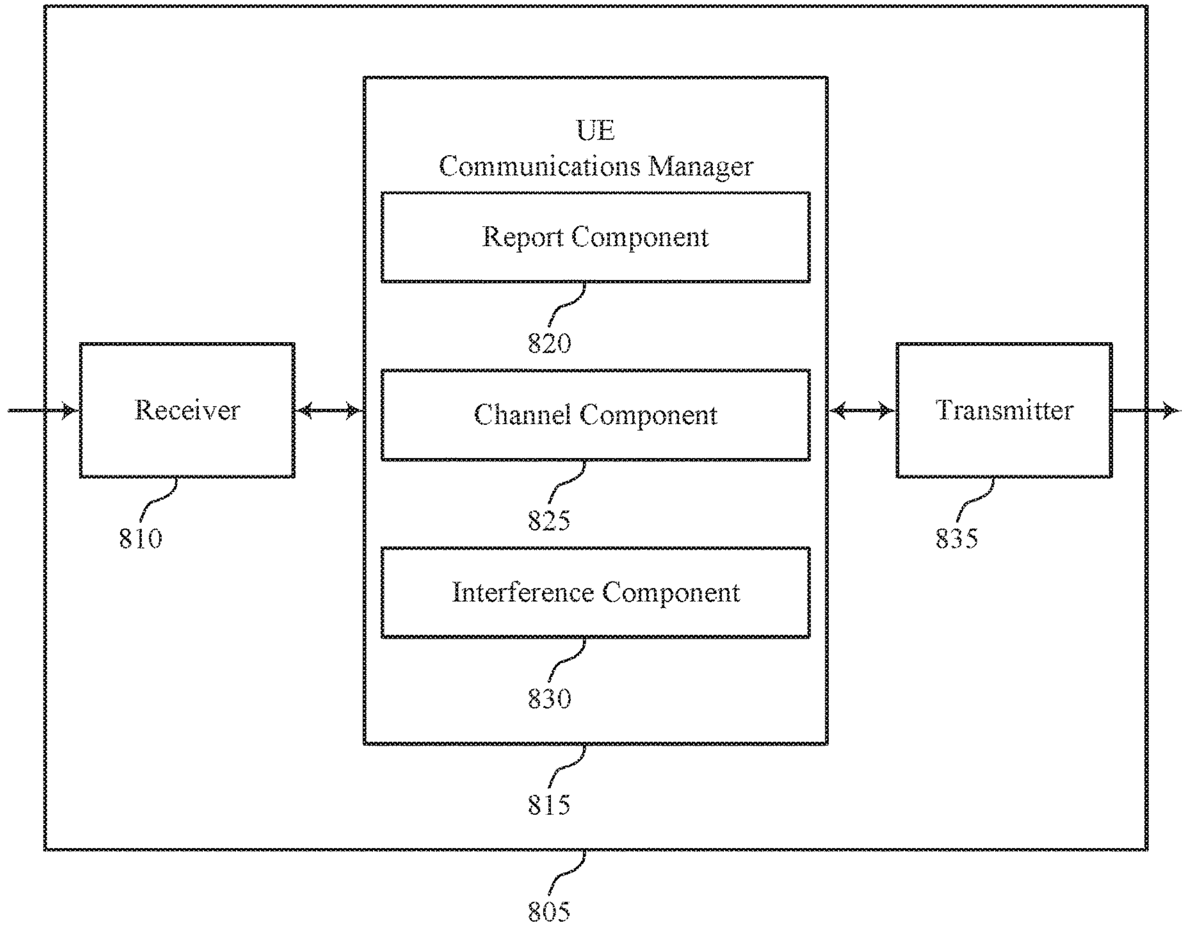

FIG. 8 shows a block diagram 800 of a device 805 that supports reporting configurations for channel and interference measurement in accordance with aspects of the present disclosure. The device 805 may be an example of aspects of a device 705, or a UE 115 as described herein. The device 805 may include a receiver 810, a UE communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to reporting configurations for channel and interference measurement, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a report component 820, a channel component 825, and an interference component 830. The UE communications manager 815 may be an example of aspects of the UE communications manager 1010 described herein.

The report component 820 may receive, from a base station 105, a report configuration including a first set of QCL parameters for channel measurement and a second set of QCL parameters for interference measurement, where at least one QCL reference associated with a first QCL parameter of the first set is different than a QCL reference associated with a second QCL parameter of the second set and transmit, to the base station 105, a generated report based on a channel measurement and an interference measurement. The channel component 825 may perform the channel measurement based on a first resource setting for the channel measurement and the first set of QCL parameters. The interference component 830 may perform the interference measurement based on a second resource setting for the interference measurement and the second set of QCL parameters.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
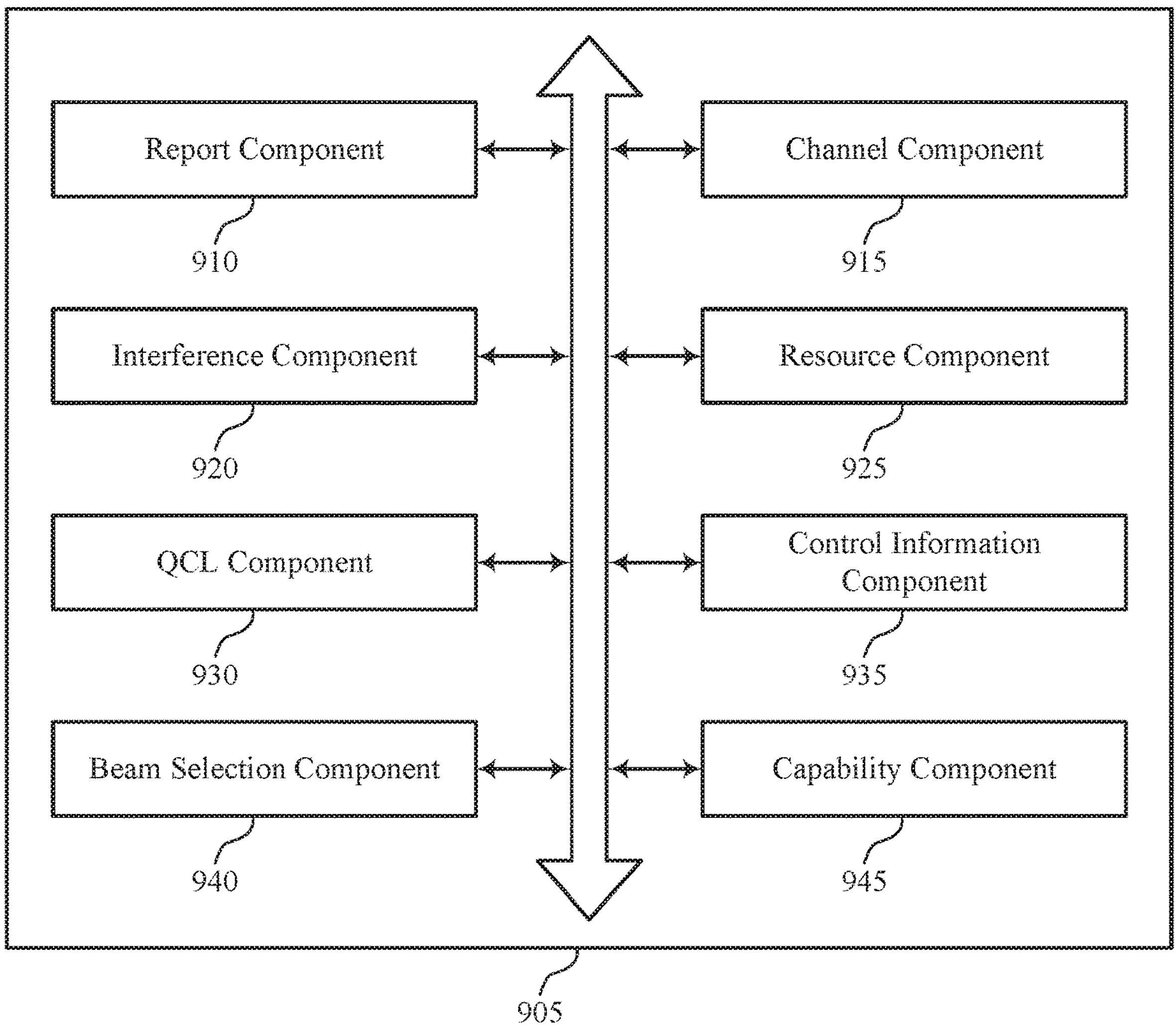
FIG. 9 shows a block diagram of a UE communications manager that supports reporting configurations for channel and interference measurement in accordance with aspects of the present disclosure.

FIG. 9 shows a block diagram 900 of a UE communications manager 905 that supports reporting configurations for channel and interference measurement in accordance with aspects of the present disclosure. The UE communications manager 905 may be an example of aspects of a UE communications manager 715, a UE communications manager 815, or a UE communications manager 1010 described herein. The UE communications manager 905 may include a report component 910, a channel component 915, an interference component 920, a resource component 925, a QCL component 930, a control information component 935, a beam selection component 940, and a capability component 945. Each of these modules may communicate, directly or indirectly, with one another (e.g., via one or more buses).

The report component 910 may receive, from a base station 105, a report configuration including a first set of QCL parameters for channel measurement and a second set of QCL parameters for interference measurement, where at least one QCL reference associated with a first QCL parameter of the first set is different than a QCL reference associated with a second QCL parameter of the second set. In some cases, the second set of QCL parameters for the interference measurement includes a subset of the first set of QCL parameters for the channel measurement. In some cases, the first set of QCL parameters for the channel measurement and the second set of QCL parameters for the interference measurement corresponds to one or more spatial receive beams. In some examples, the QCL reference associated with the first QCL parameter of the first set and the QCL reference associated with the second QCL parameter of the second set may have different QCL TypeD references that correspond to different spatial receive beams. In some cases, the report configuration includes an L1-SINR report setting or a CSI report setting. In some cases, the report configuration includes an L1-SINR report setting and is absent a CSI report setting.

In some examples, the report component 910 may transmit, to the base station 105, a generated report based on the channel measurement and the interference measurement. The report component 910 may generate the report based on the channel measurement, the interference measurement, and the report configuration, where transmitting the generated report may be based on generating the report. In some examples, transmitting, to the base station 105, the report includes transmitting SINR information. In some examples, transmitting, to the base station 105, the report includes transmitting a CQI, a PMI, or an RI, or any combination thereof.

The channel component 915 may perform the channel measurement based on a first resource setting for the channel measurement and the first set of QCL parameters. In some examples, the channel component 915 may measure the channel measurement on the resource using a first spatial receive beam associated with the first QCL parameter of the first set, the first spatial receive beam having a first QCL TypeD reference. In some examples, performing the channel measurement may be further based on measuring the channel measurement on the resource using the first spatial receive beam. In some examples, the channel component 915 may measure the channel measurement on the resource using at least two spatial receive beams associated with the first set, where a first spatial receive beam of the at least two spatial receive beams corresponds to the first QCL parameter of the first set and a second spatial receive beam of the at least two spatial receive beams corresponds to an additional QCL parameter of the first set, the first spatial receive beam having a first QCL TypeD reference and the second spatial receive beam having a second QCL TypeD reference. In some examples, performing the channel measurement may be further based on measuring the channel measurement on the resource using the at least two spatial receive beams. In some examples, the channel component 915 may measure the channel measurement on a resource using the one or more spatial receive beams. In some examples, performing the channel measurement may be further based on measuring the channel measurement on the resource using the one or more spatial receive beams. In some cases, the first resource setting or the second resource setting, or both includes ZP CSI-RS resources or NZP CSI-RS resources, or both.

The interference component 920 may perform the interference measurement based on a second resource setting for the interference measurement and the second set of QCL parameters. In some examples, the interference component 920 may measure the interference measurement on the one or more resources using a second spatial receive beam associated with the second QCL parameter of the second set, the second spatial receive beam having a second QCL TypeD reference. In some cases, the second spatial receive beam may be different than the first spatial receive beam. In some examples, performing the interference measurement may be further based on measuring the interference measurement on the one or more resources using the second spatial receive beam. In some examples, measuring the interference measurement on the one or more resources using a third spatial receive beam associated with the second QCL parameter of the second set, where the third spatial receive beam includes at least one spatial receive beam of the least two spatial receive beams associated with the channel measurement, the third spatial receive beam having at least one of the first QCL TypeD reference or the second QCL TypeD reference. In some examples, performing the interference measurement may be further based on measuring the interference measurement on the one or more resources using the third spatial receive beam. In some examples, the interference component 920 may measure the interference measurement on one or more resources using one or more selected spatial receive beams. In some examples, performing the interference measurement may be further based on measuring the interference measurement on the one or more resources using the selected one or more spatial receive beams.

The resource component 925 may identify a resource for the channel measurement based on the first resource setting. In some examples, the resource component 925 may identify one or more resources for the interference measurement based on the second resource setting. The QCL component 930 may receive multiple different QCL parameter sets via higher layer signaling. In some examples, the higher layer signaling includes MAC-CE signaling or RRC signaling, or both.

The control information component 935 may receive control information including an indication of a selection of a QCL parameter set of the multiple different QCL parameter sets, where the selected QCL parameter set includes at least one of the first set, the second set, or a third set of QCL parameters. In some examples, receiving the control information includes receiving DCI signaling. In some examples, receiving additional control information including a second indication of a second selection of a second QCL parameter set of the multiple different QCL parameter sets, where the selected second QCL parameter set includes at least one of the first set, the second set, or the third set of QCL parameters. In some examples, receiving the additional control information includes receiving DCI signaling. In some examples, receiving the additional control information includes receiving the additional control information via MAC-CE signaling. In some examples, receiving the additional control information includes receiving the additional control information via RRC signaling.

The beam selection component 940 may select one or more spatial receive beams for channel measurement based on the indication. In some examples, selecting one or more spatial receive beams for the interference measurement based on the second indication, where the one or more spatial receive beams includes at least one of the one or more spatial receive beams associated with the channel measurement. In some examples, selecting the spatial receive beam associated with the second set includes selecting, for each resource set associated with the second resource setting for the interference measurement, a QCL parameter in the second set sequentially. In some examples, selecting the spatial receive beam associated with the second set includes selecting, for each resource set associated with the second resource setting for the interference measurement, a QCL parameter in the second set non-sequentially.

The capability component 945 may transmit capability information to the base station, the capability information including a single TRP capability, a set of TRPs capabilities, or a set of tracking reference signaling capabilities, or any combination thereof. In some examples, the capability component 945 may receive the report configuration further based on the capability information.

Figure 10:
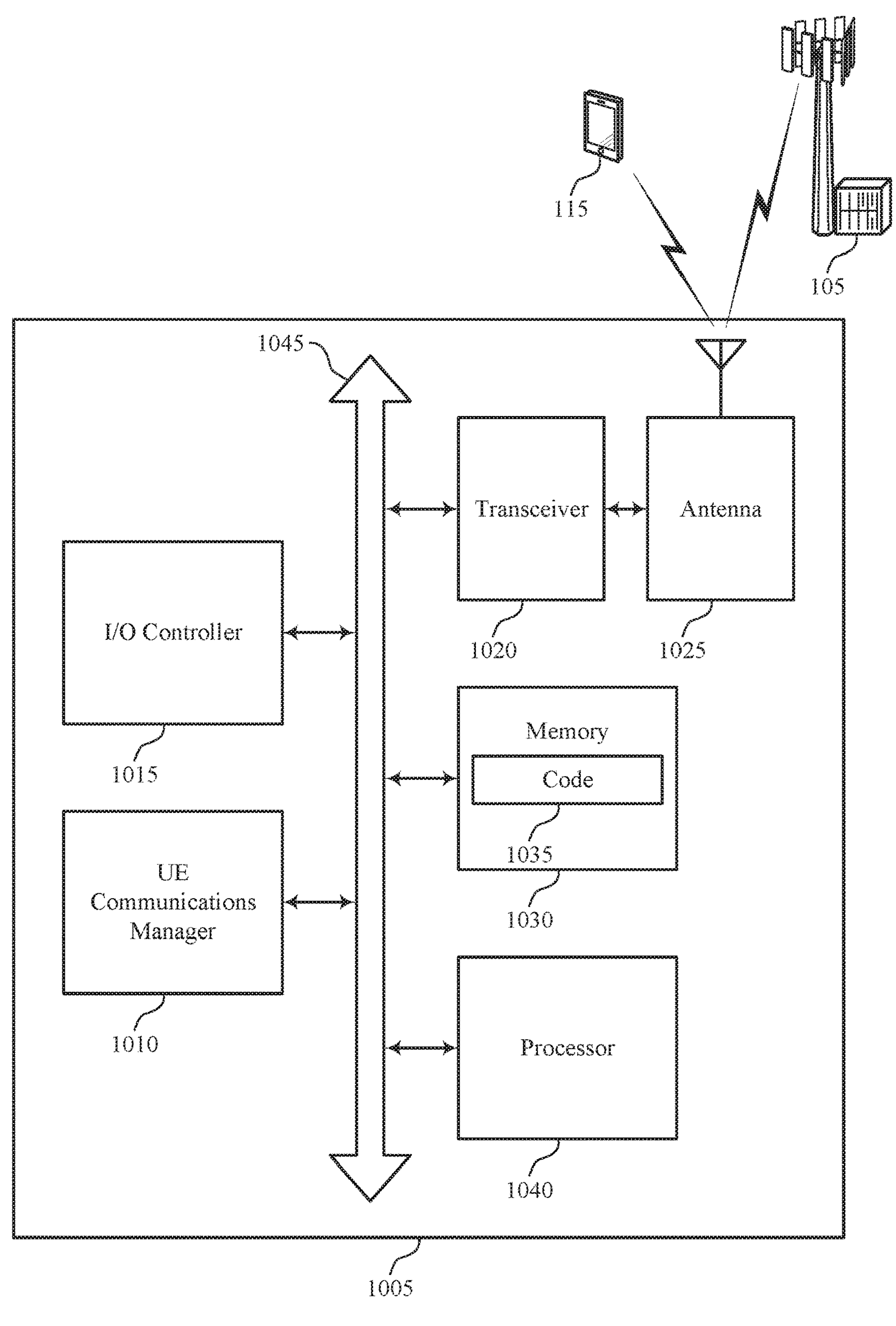
FIG. 10 shows a diagram of a system including a device that supports reporting configurations for channel and interference measurement in accordance with aspects of the present disclosure.

FIG. 10 shows a diagram of a system 1000 including a device 1005 that supports reporting configurations for channel and interference measurement in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

The UE communications manager 1010 may receive, from a base station 105, a report configuration including a first set of QCL parameters for channel measurement and a second set of QCL parameters for interference measurement, where at least one QCL reference associated with a first QCL parameter of the first set is different than a QCL reference associated with a second QCL parameter of the second set, perform the channel measurement based on a first resource setting for the channel measurement and the first set of QCL parameters, perform the interference measurement based on a second resource setting for the interference measurement and the second set of QCL parameters, and transmit, to the base station 105, a generated report based on the channel measurement and the interference measurement.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting reporting configurations for channel and interference measurement).

Figure 11:
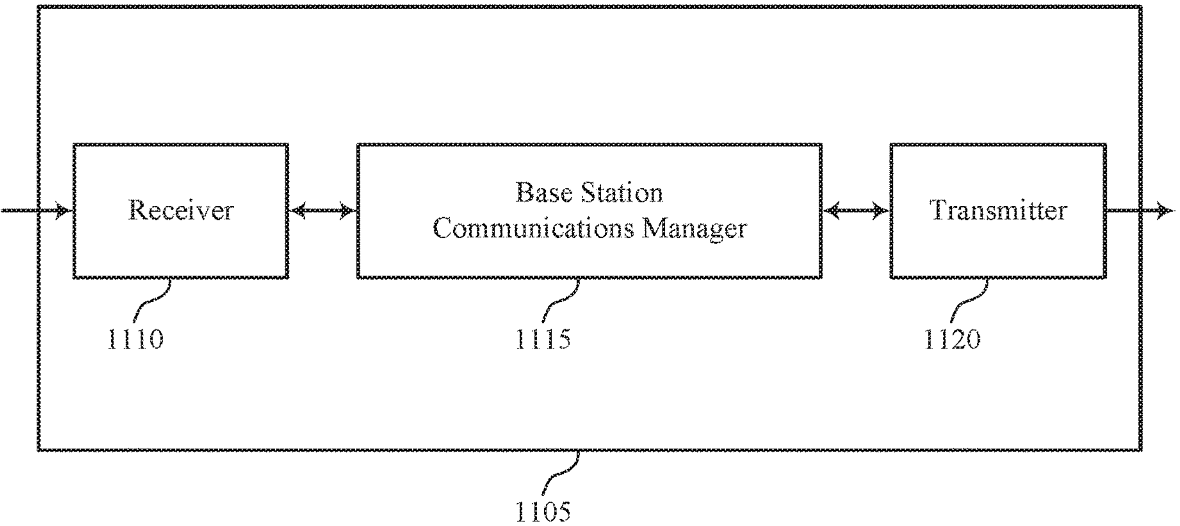
FIGS. 11 and 12 show block diagrams of devices that support reporting configurations for channel and interference measurement in accordance with aspects of the present disclosure.

FIG. 11 shows a block diagram 1100 of a device 1105 that supports reporting configurations for channel and interference measurement in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to reporting configurations for channel and interference measurement, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may configure, for a UE 115, a report configuration including a first set of QCL parameters for channel measurement and a second set of QCL parameters for interference measurement, where at least one QCL reference associated with a first QCL parameter of the first set is different than a QCL reference associated with a second QCL parameter of the second set and transmit the report configuration to the UE 115. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
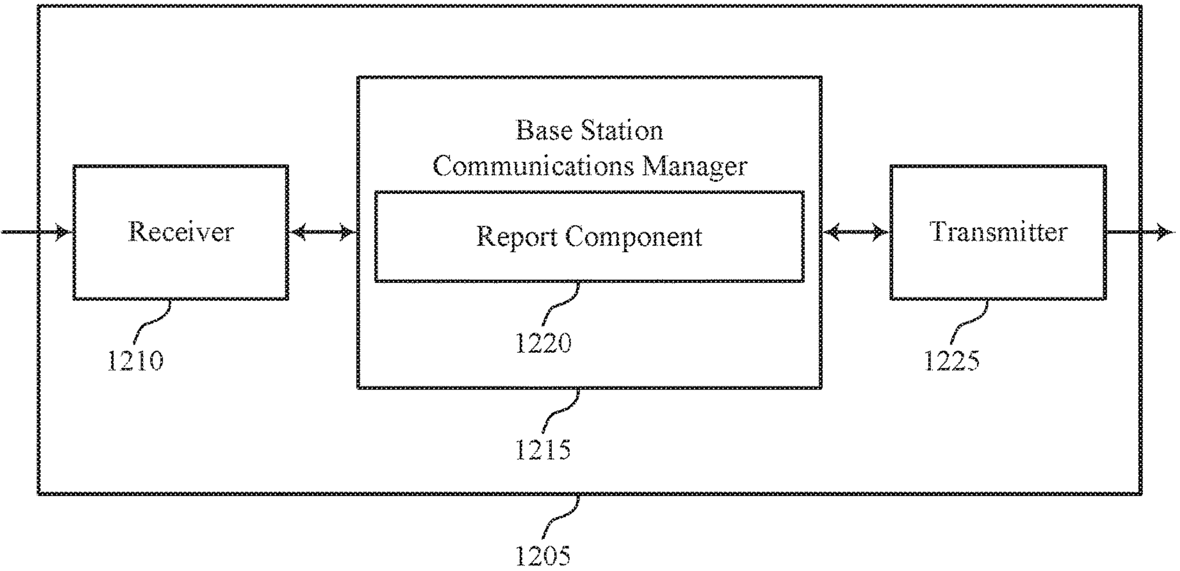

FIG. 12 shows a block diagram 1200 of a device 1205 that supports reporting configurations for channel and interference measurement in accordance with aspects of the present disclosure. The device 1205 may be an example of aspects of a device 1105, or a base station 105 as described herein. The device 1205 may include a receiver 1210, a base station communications manager 1215, and a transmitter 1225. The device 1205 may also include a processor. Each of these components may be in communication with one another (e.g., via one or more buses).

The receiver 1210 may receive information such as packets, user data, or control information associated with various information channels (e.g., control channels, data channels, and information related to reporting configurations for channel and interference measurement, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a report component 1220. The base station communications manager 1215 may be an example of aspects of the base station communications manager 1410 described herein.

The report component 1220 may configure, for a UE 115, a report configuration including a first set of QCL parameters for channel measurement and a second set of QCL parameters for interference measurement, where at least one QCL reference associated with a first QCL parameter of the first set is different than a QCL reference associated with a second QCL parameter of the second set and transmit the report configuration to the UE 115.

The transmitter 1225 may transmit signals generated by other components of the device 1205. In some examples, the transmitter 1225 may be collocated with a receiver 1210 in a transceiver module. For example, the transmitter 1225 may be an example of aspects of the transceiver 1420 described with reference to FIG. 14. The transmitter 1225 may utilize a single antenna or a set of antennas.

Figure 13:
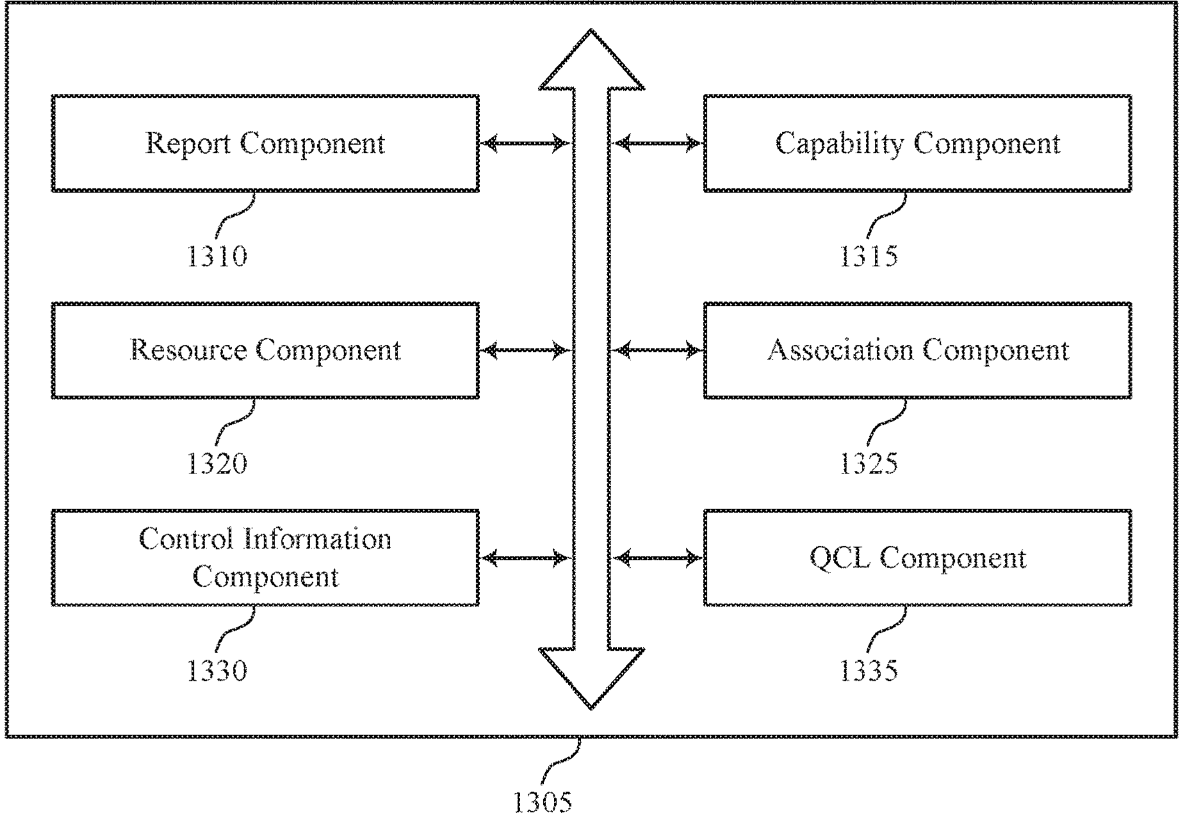
FIG. 13 shows a block diagram of a base station communications manager that supports reporting configurations for channel and interference measurement in accordance with aspects of the present disclosure.

FIG. 13 shows a block diagram 1300 of a base station communications manager 1305 that supports reporting configurations for channel and interference measurement in accordance with aspects of the present disclosure. The base station communications manager 1305 may be an example of aspects of a base station communications manager 1115, a base station communications manager 1215, or a base station communications manager 1410 described herein. The base station communications manager 1305 may include a report component 1310, a capability component 1315, a resource component 1320, an association component 1325, a control information component 1330, and a QCL component 1335. Each of these modules may communicate, directly or indirectly, with one another (e.g., via one or more buses).

The report component 1310 may configure, for a UE 115, a report configuration including a first set of QCL parameters for channel measurement and a second set of QCL parameters for interference measurement, where at least one QCL reference associated with a first QCL parameter of the first set is different than a QCL reference associated with a second QCL parameter of the second set. In some examples, the report component 1310 may transmit the report configuration to the UE 115. In some examples, the report component 1310 may receive, from the UE 115, a generated report based on a channel measurement and an interference measurement by the UE 115. In some examples, the report component 1310 may different QCL TypeD references that correspond to different spatial receive beams. In some cases, the second set of QCL parameters for the interference measurement includes a subset of the first set of QCL parameters for the channel measurement. In some cases, the first set of QCL parameters for the channel measurement and the second set of QCL parameters for the interference measurement corresponds to one or more spatial receive beams.

The capability component 1315 may receive, from the UE 115, capability information including a single TRP capability, a set of TRPs capabilities, or a set of tracking reference signaling capabilities, or any combination thereof. In some examples, the capability component 1315 may configure the report configuration further based on the capability information. The resource component 1320 may allocate a resource for the channel measurement, where a first resource setting includes the allocated resource for the channel measurement. The resource component 1320 may allocate one or more resources for the interference measurement, where a second resource setting includes the one or more allocated resources for the interference measurement. In some cases, the first resource setting or the second resource setting, or both includes ZP CSI-RS resources or NZP CSI-RS resources, or both. The association component 1325 may associate the first set with the allocated resource in the first resource setting. In some examples, the association component 1325 may associate the second set with the one or more allocated resources in the second resource setting.

The control information component 1330 may transmit control information including an indication of at least one of the first QCL parameter of the first set or a subset of QCL parameters of the first set. In some examples, transmitting the control information includes transmitting DCI signaling. In some examples, the control information component 1330 may transmit additional control information including a second indication of at least one of the second QCL parameter of the second set or a subset of QCL parameters of the first set. In some examples, transmitting the additional control information includes transmitting DCI signaling. In some examples, transmitting the additional control information includes transmitting the additional control information via MAC-CE signaling. In some examples, transmitting the additional control information includes transmitting the additional control information via RRC signaling. The QCL component 1335 may transmit multiple different QCL parameter sets via higher layer signaling. In some examples, the higher layer signaling includes MAC-CE signaling or RRC signaling, or both.

Figure 14:
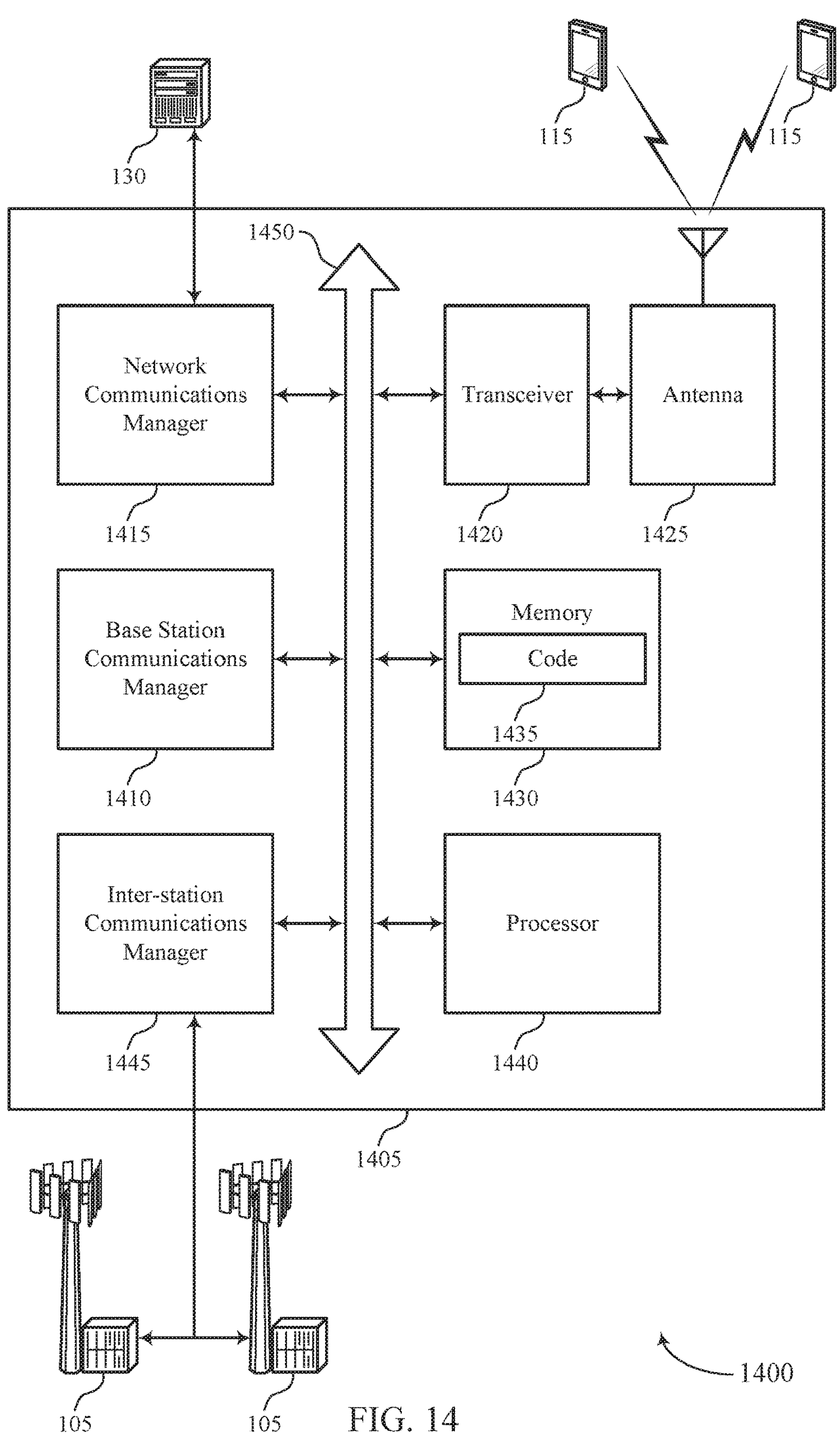
FIG. 14 shows a diagram of a system including a device that supports reporting configurations for channel and interference measurement in accordance with aspects of the present disclosure.

FIG. 14 shows a diagram of a system 1400 including a device 1405 that supports reporting configurations for channel and interference measurement in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may configure, for a UE 115, a report configuration including a first set of QCL parameters for channel measurement and a second set of QCL parameters for interference measurement, where at least one QCL reference associated with a first QCL parameter of the first set is different than a QCL reference associated with a second QCL parameter of the second set and transmit the report configuration to the UE 115.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting reporting configurations for channel and interference measurement).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
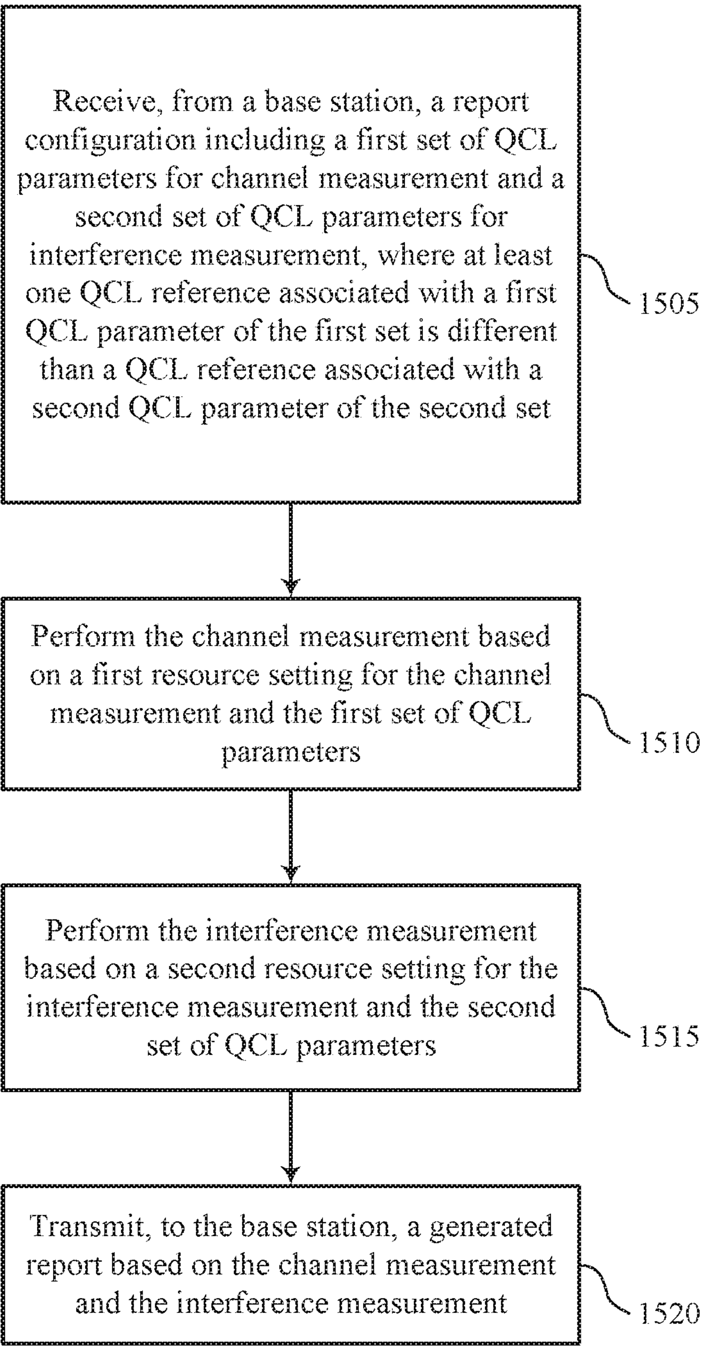
FIGS. 15 through 20 show flowcharts illustrating methods that support reporting configurations for channel and interference measurement in accordance with aspects of the present disclosure.

FIG. 15 shows a flowchart illustrating a method 1500 that supports reporting configurations for channel and interference measurement in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a report configuration including a first set of QCL parameters for channel measurement and a second set of QCL parameters for interference measurement, where at least one QCL reference associated with a first QCL parameter of the first set is different than a QCL reference associated with a second QCL parameter of the second set. The operations of 1505 may be performed according to the methods described herein. In some examples, aspects of the operations of 1505 may be performed by a report component as described with reference to FIGS. 7 through 10.

At 1510, the UE may perform the channel measurement based on a first resource setting for the channel measurement and the first set of QCL parameters. The operations of 1510 may be performed according to the methods described herein. In some examples, aspects of the operations of 1510 may be performed by a channel component as described with reference to FIGS. 7 through 10.

At 1515, the UE may perform the interference measurement based on a second resource setting for the interference measurement and the second set of QCL parameters. The operations of 1515 may be performed according to the methods described herein. In some examples, aspects of the operations of 1515 may be performed by an interference component as described with reference to FIGS. 7 through 10.

At 1520, the UE may transmit, to the base station, a generated report based on the channel measurement and the interference measurement. The operations of 1520 may be performed according to the methods described herein. In some examples, aspects of the operations of 1520 may be performed by a report component as described with reference to FIGS. 7 through 10.

Figure 16:
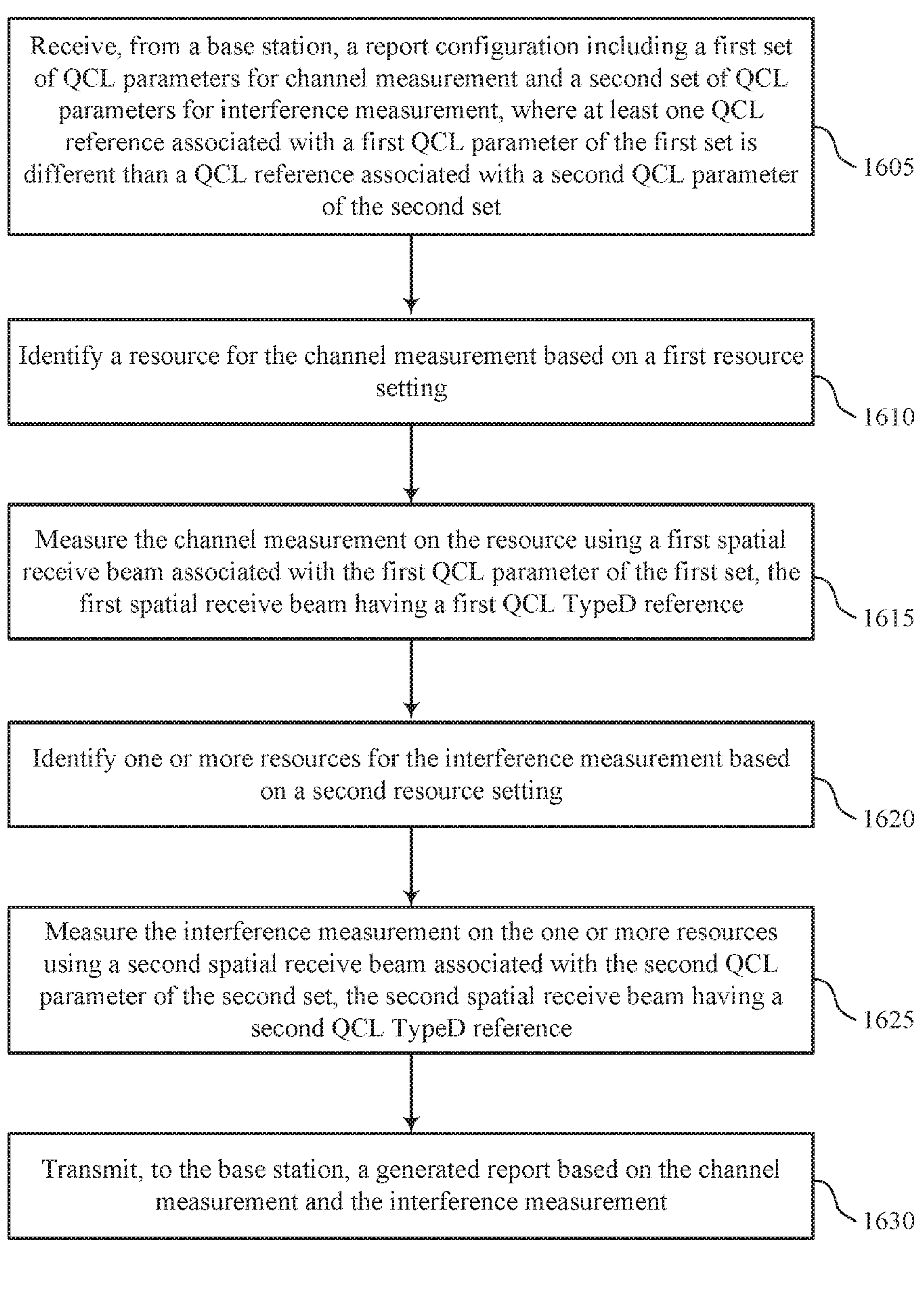

FIG. 16 shows a flowchart illustrating a method 1600 that supports reporting configurations for channel and interference measurement in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a report configuration including a first set of QCL parameters for channel measurement and a second set of QCL parameters for interference measurement, where at least one QCL reference associated with a first QCL parameter of the first set is different than a QCL reference associated with a second QCL parameter of the second set. The operations of 1605 may be performed according to the methods described herein. In some examples, aspects of the operations of 1605 may be performed by a report component as described with reference to FIGS. 7 through 10.

At 1610, the UE may identify a resource for the channel measurement based on a first resource setting. The operations of 1610 may be performed according to the methods described herein. In some examples, aspects of the operations of 1610 may be performed by a resource component as described with reference to FIGS. 7 through 10.

At 1615, the UE may measure the channel measurement on the resource using a first spatial receive beam associated with the first QCL parameter of the first set, the first spatial receive beam having a first QCL TypeD reference. The operations of 1615 may be performed according to the methods described herein. In some examples, aspects of the operations of 1615 may be performed by a channel component as described with reference to FIGS. 7 through 10.

At 1620, the UE may identify one or more resources for the interference measurement based on a second resource setting. The operations of 1620 may be performed according to the methods described herein. In some examples, aspects of the operations of 1620 may be performed by a resource component as described with reference to FIGS. 7 through 10.

At 1625, the UE may measure the interference measurement on the one or more resources using a second spatial receive beam associated with the second QCL parameter of the second set, the second spatial receive beam having a second QCL TypeD reference. The operations of 1625 may be performed according to the methods described herein. In some examples, aspects of the operations of 1625 may be performed by an interference component as described with reference to FIGS. 7 through 10.

At 1630, the UE may transmit, to the base station, a generated report based on the channel measurement and the interference measurement. The operations of 1630 may be performed according to the methods described herein. In some examples, aspects of the operations of 1630 may be performed by a report component as described with reference to FIGS. 7 through 10.

Figure 17:
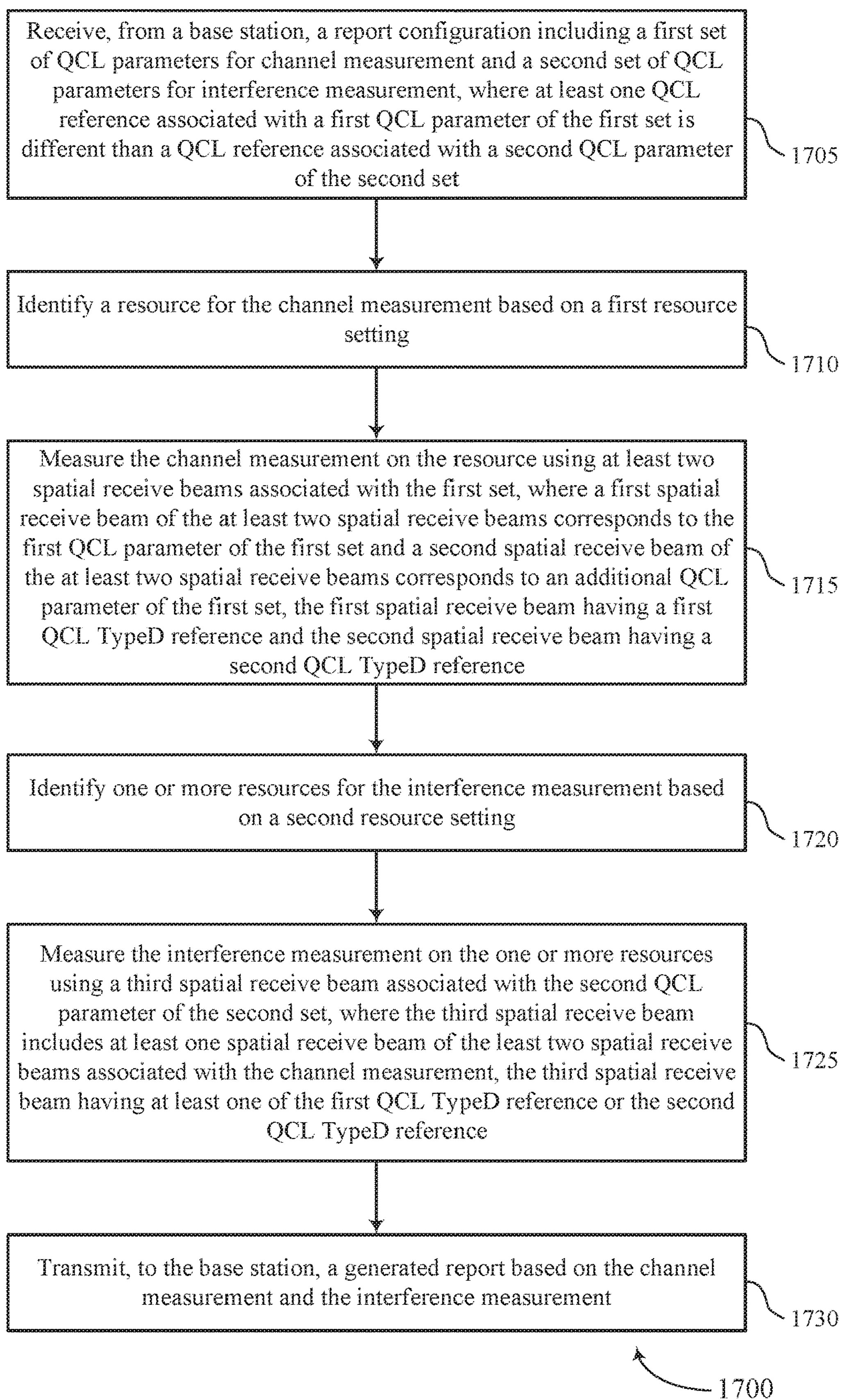

FIG. 17 shows a flowchart illustrating a method 1700 that supports reporting configurations for channel and interference measurement in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a report configuration including a first set of QCL parameters for channel measurement and a second set of QCL parameters for interference measurement, where at least one QCL reference associated with a first QCL parameter of the first set is different than a QCL reference associated with a second QCL parameter of the second set. The operations of 1705 may be performed according to the methods described herein. In some examples, aspects of the operations of 1705 may be performed by a report component as described with reference to FIGS. 7 through 10.

At 1710, the UE may identify a resource for the channel measurement based on a first resource setting. The operations of 1710 may be performed according to the methods described herein. In some examples, aspects of the operations of 1710 may be performed by a resource component as described with reference to FIGS. 7 through 10.

At 1715, the UE may measure the channel measurement on the resource using at least two spatial receive beams associated with the first set, where a first spatial receive beam of the at least two spatial receive beams corresponds to the first QCL parameter of the first set and a second spatial receive beam of the at least two spatial receive beams corresponds to an additional QCL parameter of the first set, the first spatial receive beam having a first QCL TypeD reference and the second spatial receive beam having a second QCL TypeD reference. The operations of 1715 may be performed according to the methods described herein. In some examples, aspects of the operations of 1715 may be performed by a channel component as described with reference to FIGS. 7 through 10.

At 1720, the UE may identify one or more resources for the interference measurement based on a second resource setting. The operations of 1720 may be performed according to the methods described herein. In some examples, aspects of the operations of 1720 may be performed by a resource component as described with reference to FIGS. 7 through 10.

At 1725, the UE may measure the interference measurement on the one or more resources using a third spatial receive beam associated with the second QCL parameter of the second set, where the third spatial receive beam includes at least one spatial receive beam of the least two spatial receive beams associated with the channel measurement, the third spatial receive beam having at least one of the first QCL TypeD reference or the second QCL TypeD reference. The operations of 1725 may be performed according to the methods described herein. In some examples, aspects of the operations of 1725 may be performed by an interference component as described with reference to FIGS. 7 through 10.

At 1730, the UE may transmit, to the base station, a generated report based on the channel measurement and the interference measurement. The operations of 1730 may be performed according to the methods described herein. In some examples, aspects of the operations of 1730 may be performed by a report component as described with reference to FIGS. 7 through 10.

Figure 18:
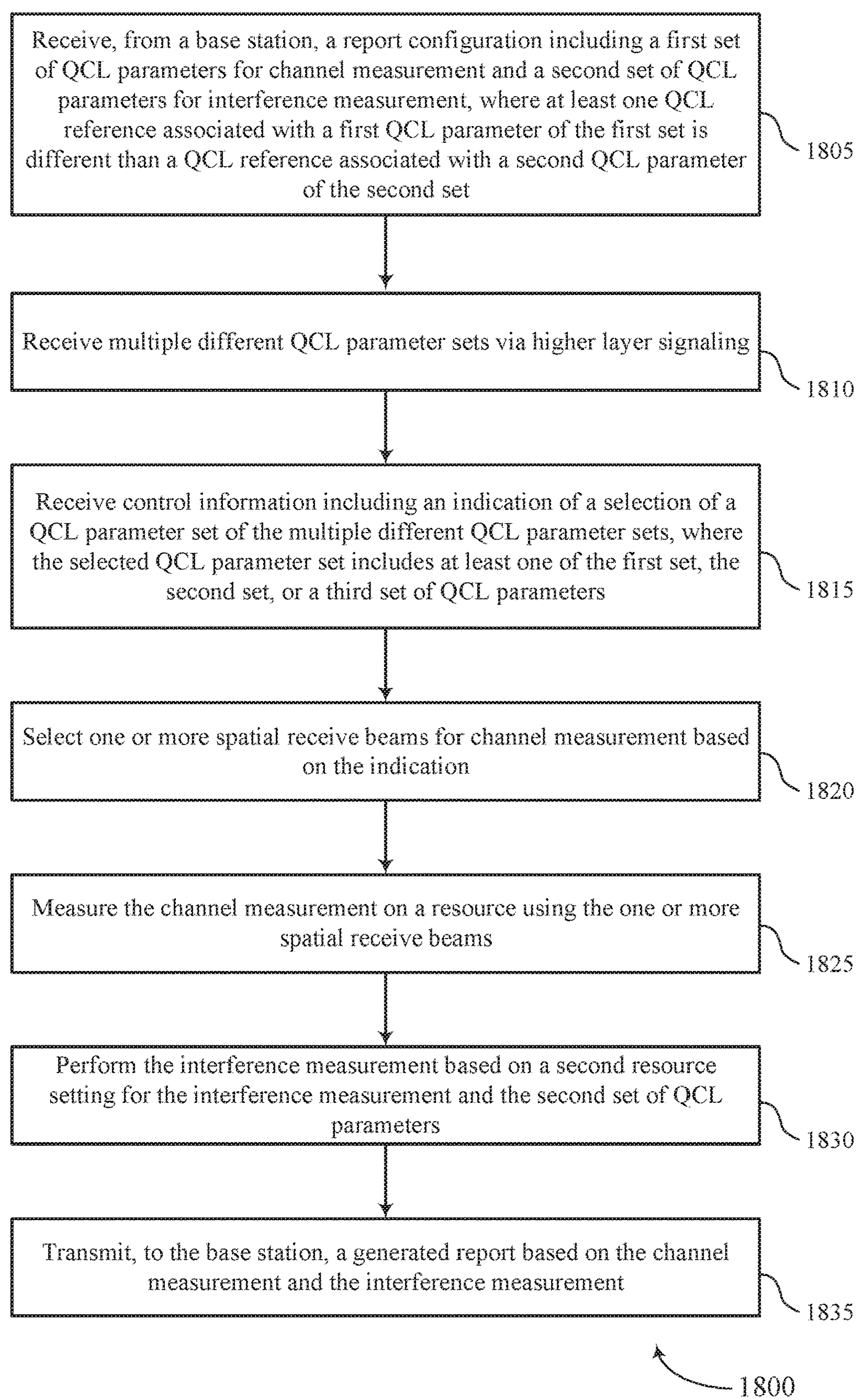

FIG. 18 shows a flowchart illustrating a method 1800 that supports reporting configurations for channel and interference measurement in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a report configuration including a first set of QCL parameters for channel measurement and a second set of QCL parameters for interference measurement, where at least one QCL reference associated with a first QCL parameter of the first set is different than a QCL reference associated with a second QCL parameter of the second set. The operations of 1805 may be performed according to the methods described herein. In some examples, aspects of the operations of 1805 may be performed by a report component as described with reference to FIGS. 7 through 10.

At 1810, the UE may receive multiple different QCL parameter sets via higher layer signaling. The operations of

1810 may be performed according to the methods described herein. In some examples, aspects of the operations of 1810 may be performed by a QCL component as described with reference to FIGS. 7 through 10.

At 1815, the UE may receive control information including an indication of a selection of a QCL parameter set of the multiple different QCL parameter sets, where the selected QCL parameter set includes at least one of the first set, the second set, or a third set of QCL parameters. The operations of 1815 may be performed according to the methods described herein. In some examples, aspects of the operations of 1815 may be performed by a control information component as described with reference to FIGS. 7 through 10.

At 1820, the UE may select one or more spatial receive beams for channel measurement based on the indication. The operations of 1820 may be performed according to the methods described herein. In some examples, aspects of the operations of 1820 may be performed by a beam selection component as described with reference to FIGS. 7 through 10.

At 1825, the UE may measure the channel measurement on a resource using the one or more spatial receive beams. The operations of 1825 may be performed according to the methods described herein. In some examples, aspects of the operations of 1825 may be performed by a channel component as described with reference to FIGS. 7 through 10.

At 1830, the UE may perform the interference measurement based on a second resource setting for the interference measurement and the second set of QCL parameters. The operations of 1830 may be performed according to the methods described herein. In some examples, aspects of the operations of 1830 may be performed by an interference component as described with reference to FIGS. 7 through 10.

At 1835, the UE may transmit, to the base station, a generated report based on the channel measurement and the interference measurement. The operations of 1835 may be performed according to the methods described herein. In some examples, aspects of the operations of 1835 may be performed by a report component as described with reference to FIGS. 7 through 10.

Figure 19:
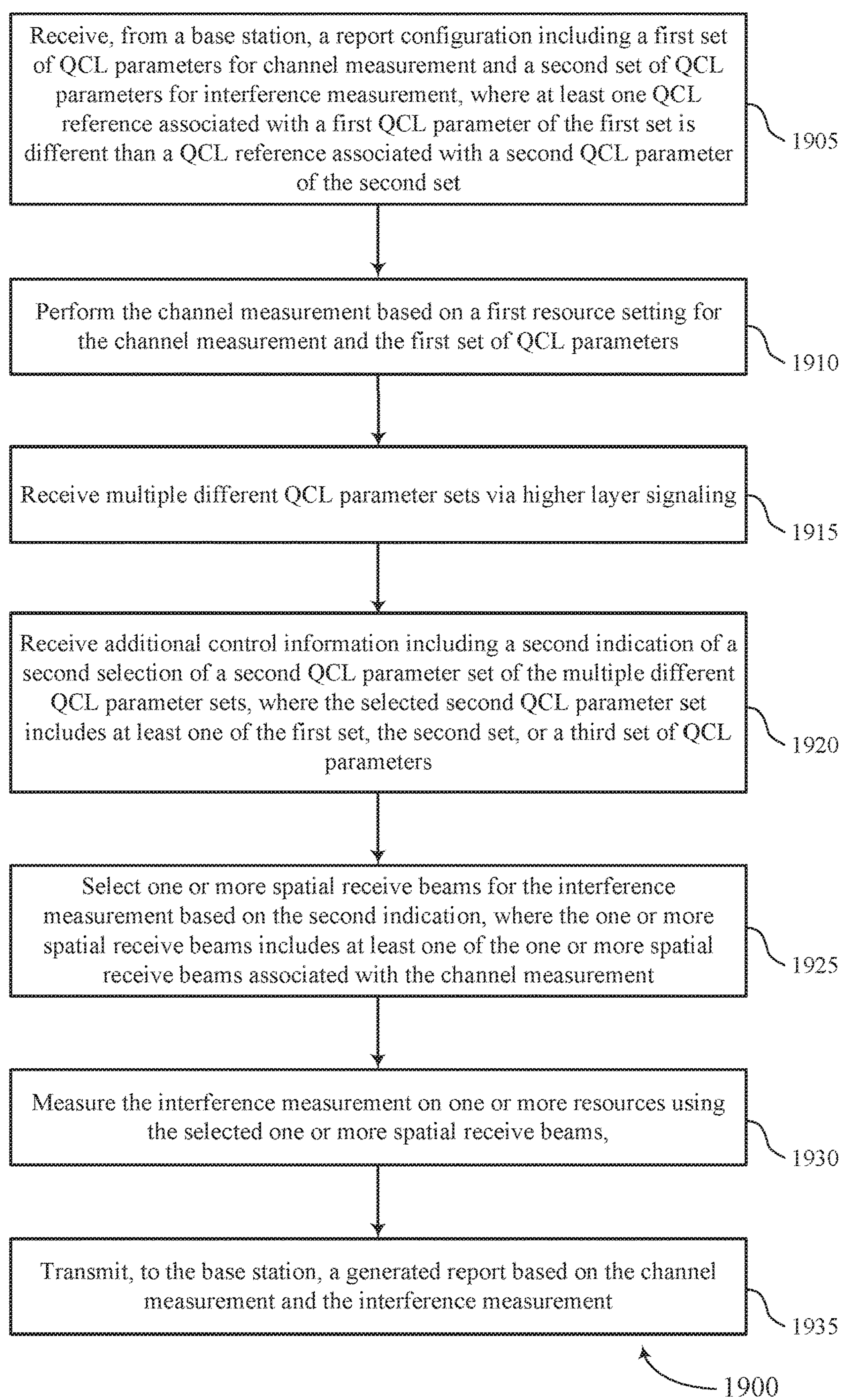

FIG. 19 shows a flowchart illustrating a method 1900 that supports reporting configurations for channel and interference measurement in accordance with aspects of the present disclosure. The operations of method 1900 may be implemented by a UE 115 or its components as described herein. For example, the operations of method 1900 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a report configuration including a first set of QCL parameters for channel measurement and a second set of QCL parameters for interference measurement, where at least one QCL reference associated with a first QCL parameter of the first set is different than a QCL reference associated with a second QCL parameter of the second set. The operations of 1905 may be performed according to the methods described herein. In some examples, aspects of the operations of 1905 may be performed by a report component as described with reference to FIGS. 7 through 10.

At 1910, the UE may perform the channel measurement based on a first resource setting for the channel measurement and the first set of QCL parameters. The operations of 1910 may be performed according to the methods described herein. In some examples, aspects of the operations of 1910 may be performed by a channel component as described with reference to FIGS. 7 through 10.

At 1915, the UE may receive multiple different QCL parameter sets via higher layer signaling. The operations of 1915 may be performed according to the methods described herein. In some examples, aspects of the operations of 1915 may be performed by a QCL component as described with reference to FIGS. 7 through 10.

At 1920, the UE may receive additional control information including a second indication of a second selection of a second QCL parameter set of the multiple different QCL parameter sets, where the selected second QCL parameter set includes at least one of the first set, the second set, or a third set of QCL parameters. The operations of 1920 may be performed according to the methods described herein. In some examples, aspects of the operations of 1920 may be performed by a control information component as described with reference to FIGS. 7 through 10.

At 1925, the UE may select one or more spatial receive beams for the interference measurement based on the second indication, where the one or more spatial receive beams includes at least one of the one or more spatial receive beams associated with the channel measurement. The operations of 1925 may be performed according to the methods described herein. In some examples, aspects of the operations of 1925 may be performed by a beam selection component as described with reference to FIGS. 7 through 10.

At 1930, the UE may measure the interference measurement on one or more resources using the selected one or more spatial receive beams. The operations of 1930 may be performed according to the methods described herein. In some examples, aspects of the operations of 1930 may be performed by an interference component as described with reference to FIGS. 7 through 10.

At 1935, the UE may transmit, to the base station, a generated report based on the channel measurement and the interference measurement. The operations of 1935 may be performed according to the methods described herein. In some examples, aspects of the operations of 1935 may be performed by a report component as described with reference to FIGS. 7 through 10.

Figure 20:
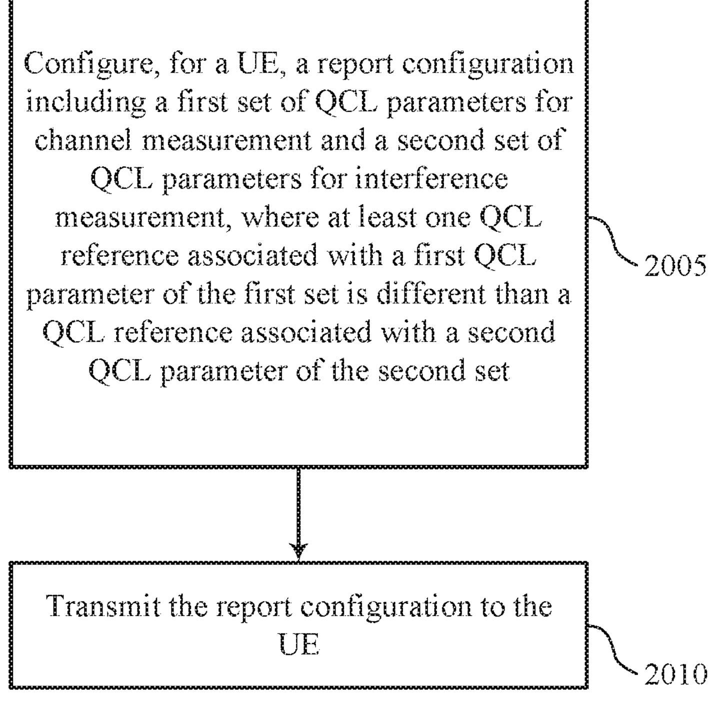

FIG. 20 shows a flowchart illustrating a method 2000 that supports reporting configurations for channel and interference measurement in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may configure, for a UE, a report configuration including a first set of QCL parameters for channel measurement and a second set of QCL parameters for interference measurement, where at least one QCL reference associated with a first QCL parameter of the first set is different than a QCL reference associated with a second QCL parameter of the second set. The operations of 2005 may be performed according to the methods described herein. In some examples, aspects of the operations of 2005 may be performed by a report component as described with reference to FIGS. 11 through 14.

At 2010, the base station may transmit the report configuration to the UE. The operations of 2010 may be performed according to the methods described herein. In some examples, aspects of the operations of 2010 may be performed by a report component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:

receiving, from a base station, a report configuration comprising a first set of quasi co-location parameters for channel measurement and a second set of quasi co-location parameters for interference measurement;

identifying a resource for the channel measurement based at least in part on a first resource setting for the channel measurement;

performing, using a first spatial receive beam associated with a quasi co-location reference from the first set of quasi co-location parameters, the quasi co-location reference from the first set of quasi co-location parameters comprising a first quasi co-location TypeD reference, the channel measurement on the identified resource based at least in part on the first resource setting for the channel measurement and the first set of quasi co-location parameters;

performing, using a second spatial receive beam associated with a quasi co-location reference from the second set of quasi co-location parameters, the interference measurement based at least in part on a second resource setting for the interference measurement and the second set of quasi co-location parameters, wherein the quasi co-location reference from the second set of quasi co-location parameters is different from the quasi co-location reference from the first set of quasi co-location parameters; and transmitting, to the base station, a report based at least in part on the channel measurement and the interference measurement.

2. The method of claim 1, further comprising:

generating the report based at least in part on the channel measurement, the interference measurement, and the report configuration, wherein transmitting the report is based at least in part on generating the report.

3. The method of claim 1, wherein the second set of quasi co-location parameters for the interference measurement comprises a subset of the first set of quasi co-location parameters for the channel measurement.

4. The method of claim 1, wherein the first set of quasi co-location parameters for the channel measurement and the second set of quasi co-location parameters for the interference measurement corresponds to one or more spatial receive beams.

5. The method of claim 1, wherein the quasi co-location reference from the first set of quasi co-location parameters comprises a first quasi co-location TypeD reference that corresponds to the first spatial receive beam and the quasi co-location reference from the second set of quasi co-location parameters comprises a second quasi co-location TypeD reference that corresponds to the second spatial receive beam.

6. The method of claim 1, further comprising:

identifying one or more resources for the interference measurement based at least in part on the second resource setting; and measuring the interference measurement on the one or more resources using the second spatial receive beam, the quasi co-location reference from the second set of quasi co-location parameters comprising a second quasi co-location TypeD reference, wherein performing the interference measurement is further based at least in part on measuring the interference measurement on the one or more resources using the second spatial receive beam, wherein the second spatial receive beam is different than the first spatial receive beam.

7. The method of claim 1, further comprising:

identifying a resource for the channel measurement based at least in part on the first resource setting; and measuring the channel measurement on the resource using at least two spatial receive beams associated with the first set of quasi co-location parameters, the at least two spatial receive beams including the first spatial receive beam and a third spatial receive beam, wherein the third spatial receive beam of the at least two spatial receive beams corresponds to an additional quasi co-location parameter of the first set of quasi co-location parameters, the first spatial receive beam having the first quasi co-location TypeD reference and the third spatial receive beam having a second quasi co-location TypeD reference, wherein performing the channel measurement is further based at least in part on measuring the channel measurement on the resource using the at least two spatial receive beams.

8. The method of claim 7, further comprising:

identifying one or more resources for the interference measurement based at least in part on the second resource setting; and measuring the interference measurement on the one or more resources using the second spatial receive beam, wherein the second spatial receive beam comprises at least one spatial receive beam of the at least two spatial receive beams associated with the channel measurement, the second spatial receive beam having the second quasi co-location TypeD reference, wherein performing the interference measurement is further based at least in part on measuring the interference measurement on the one or more resources using the second spatial receive beam.

9. The method of claim 1, further comprising:

receiving multiple different quasi co-location parameter sets via higher layer signaling, wherein the higher layer signaling comprises medium access control element signaling or radio resource control signaling, or both.

10. The method of claim 9, further comprising:

receiving control information comprising an indication of a selection of a quasi co-location parameter set of the multiple different quasi co-location parameter sets, wherein the selected quasi co-location parameter set comprises at least one of the first set of quasi co-location parameters, the second set of quasi co-location parameters, or a third set of quasi co-location parameters;

selecting at least the first spatial receive beam for channel measurement based at least in part on the indication; and measuring the channel measurement on a resource using at least the first spatial receive beam, wherein performing the channel measurement is further based at least in part on measuring the channel measurement on the resource using the at least the first spatial receive beam.

11. The method of claim 9, further comprising:

receiving additional control information comprising a second indication of a second selection of a second quasi co-location parameter set of the multiple different quasi co-location parameter sets, wherein the selected second quasi co-location parameter set comprises at least one of the first set of quasi co-location parameters, the second set of quasi co-location parameters, or a third set of quasi co-location parameters;

selecting at least the second spatial receive beam for the interference measurement based at least in part on the second indication, wherein the at least the second spatial receive beam comprises at least one of one or more spatial receive beams associated with the channel measurement; and measuring the interference measurement on one or more resources using the selected at least the second spatial receive beam, wherein performing the interference measurement is further based at least in part on measuring the interference measurement on the one or more resources using the selected at least the second spatial receive beam.

12. The method of claim 11, wherein receiving the additional control information comprises receiving downlink control information signaling, medium access control element signaling, or radio resource control signaling.

13. The method of claim 11, wherein selecting at least the second spatial receive beam associated with the second set of quasi co-location parameters comprises selecting, for each resource set associated with the second resource setting for the interference measurement, a quasi co-location parameter in the second set of quasi co-location parameters sequentially.

14. The method of claim 1, further comprising:

transmitting capability information to the base station, the capability information comprising a single transmission and reception point capability, a set of transmission and reception point capabilities, or a set of tracking reference signaling capabilities, or any combination thereof, wherein receiving the report configuration is further based at least in part on the capability information.

15. The method of claim 1, wherein the report comprises signal to interference and noise ratio information, wherein transmitting, to the base station, the report comprises transmitting the signal to interference and noise ratio information.

16. The method of claim 1, wherein the report comprises channel quality comprises a channel quality indicator, a precoding matrix indicator, or a rank indicator, or any combination thereof, and wherein transmitting, to the base station, the report comprises transmitting the channel quality indicator, the precoding matrix indicator, or the rank indicator, or any combination thereof.

17. The method of claim 1, wherein the report configuration comprises a layer one signal to interference and noise ratio report setting or a channel state information report setting or both.

18. The method of claim 1, wherein the first resource setting or the second resource setting, or both comprises zero power channel state information-reference signal resources or non-zero power channel state information-reference signal resources, or both.

19. A method for wireless communication at a base station, comprising:

allocating a resource for a channel measurement, wherein a first resource setting for the channel measurement comprises the allocated resource;

configuring, for a user equipment, a report configuration comprising a first set of quasi co-location parameters for channel measurement and a second set of quasi co-location parameters for interference measurement, wherein:

the first set of quasi co-location parameters comprises a quasi co-location reference indicative of a first spatial receive beam to be used for the channel measurement on the allocated resource, the quasi co-location reference indicative of the first spatial receive beam comprising a first quasi co-location TypeD reference;

the second set of quasi co-location parameters comprises a quasi co-location reference indicative of a second spatial receive beam to be used for the interference measurement; and at least one quasi co-location reference associated with a first quasi co-location parameter of the first set of quasi co-location parameters is different than a quasi co-location reference associated with a second quasi co-location parameter of the second set of quasi co-location parameters; and transmitting the report configuration to the user equipment.

20. An apparatus for wireless communication, comprising:

one or more processors of a user equipment;

a transceiver coupled with the one or more processors; and memory coupled with the one or more processors, the memory and the one or more processors configured to cause the apparatus to:

receive, from a base station via the transceiver, a report configuration comprising a first set of quasi co-location parameters for channel measurement and a second set of quasi co-location parameters for interference measurement;

identify a resource for the channel measurement based at least in part on a first resource setting for the channel measurement;

perform, using a first spatial receive beam associated with a quasi co-location reference from the first set of quasi co-location parameters, the quasi co-location reference from the first set of quasi co-location parameters comprising a first quasi co-location TypeD reference, the channel measurement on the identified resource based at least in part on the first resource setting for the channel measurement and the first set of quasi co-location parameters;

perform, using a second spatial receive beam associated with a quasi co-location reference from the second set of quasi co-location parameters, the interference measurement based at least in part on a second resource setting for the interference measurement and the second set of quasi co-location parameters, wherein the quasi co-location reference from the second set of quasi co-location parameters is different from quasi co-location reference from the first set of quasi co-location parameters; and transmit, to the base station via the transceiver, a report based at least in part on the channel measurement and the interference measurement.

21. The apparatus of claim 20, wherein the memory and the one or more processors are further configured to cause the apparatus to:

generate the report based at least in part on the channel measurement, the interference measurement, and the report configuration, wherein transmitting the report is based at least in part on generating the report.

22. The apparatus of claim 20, wherein the second set of quasi co-location parameters for the interference measurement comprises a subset of the first set of quasi co-location parameters for the channel measurement.

23. The apparatus of claim 20, wherein the memory and the one or more processors are further configured to cause the apparatus to:

identify one or more resources for the interference measurement based at least in part on the second resource setting; and measure the interference measurement on the one or more resources using the second spatial receive beam, the quasi co-location reference from the second set of quasi co-location parameters comprising a second quasi co-location TypeD reference, wherein performing the interference measurement is further based at least in part on measuring the interference measurement on the one or more resources using the second spatial receive beam, wherein the second spatial receive beam is different than the first spatial receive beam.

24. The apparatus of claim 20, wherein the memory and the one or more processors are further configured to cause the apparatus to:

identify a resource for the channel measurement based at least in part on the first resource setting; and measure the channel measurement on the resource using at least two spatial receive beams associated with the first set of quasi co-location parameters, the at least two spatial receive beams including the first spatial receive beam and a third spatial receive beam, wherein the third spatial receive beam of the at least two spatial receive beams corresponds to an additional quasi co-location parameter of the first set of quasi co-location parameters, the first spatial receive beam having the first quasi co-location TypeD reference and the third spatial receive beam having a second quasi co-location TypeD reference, wherein performing the channel measurement is further based at least in part on measuring the channel measurement on the resource using the at least two spatial receive beams.

25. The apparatus of claim 24, wherein the memory and the one or more processors are further configured to cause the apparatus to:

identify one or more resources for the interference measurement based at least in part on the second resource setting; and measure the interference measurement on the one or more resources using the second spatial receive beam, wherein the second spatial receive beam comprises at least one spatial receive beam of the at least two spatial receive beams associated with the channel measurement, the second spatial receive beam having the second quasi co-location TypeD reference, wherein performing the interference measurement is further based at least in part on measuring the interference measurement on the one or more resources using the second spatial receive beam.

26. The apparatus of claim 25, wherein the memory and the one or more processors are further configured to cause the apparatus to:

receive control information comprising an indication of a selection of a quasi co-location parameter set of multiple different quasi co-location parameter sets, wherein the selected quasi co-location parameter set comprises at least one of the first set of quasi co-location parameters, the second set of quasi co-location parameters, or a third set of quasi co-location parameters;

select at least the first spatial receive beams for channel measurement based at least in part on the indication; and measure the channel measurement on a resource using at least the first spatial receive beam, wherein the channel measurement is further based at least in part on measuring the channel measurement on the resource using the at least the first spatial receive beam.

27. The apparatus of claim 20, wherein the memory and the one or more processors are further configured to cause the apparatus to:

receive multiple different quasi co-location parameter sets via higher layer signaling, wherein the higher layer signaling comprises medium access control element signaling or radio resource control signaling, or both.

28. The apparatus of claim 27, wherein the memory and the one or more processors are further configured to cause the apparatus to:

receive additional control information comprising a second indication of a second selection of a second quasi co-location parameter set of the multiple different quasi co-location parameter sets, wherein the selected second quasi co-location parameter set comprises at least one of the first set of quasi co-location parameters, the second set of quasi co-location parameters, or a third set of quasi co-location parameters;

select at least the second spatial receive beam for the interference measurement based at least in part on the second indication, wherein the at least the second spatial receive beam comprises at least one of one or more spatial receive beams associated with the channel measurement; and measure the interference measurement on one or more resources using the selected at least the second spatial receive beam, wherein performing the interference measurement is further based at least in part on measuring the interference measurement on the one or more resources using the selected at least the second spatial receive beam.

29. The apparatus of claim 28, wherein the memory and the one or more processors are further configured to cause the apparatus to receive the additional control information by receiving downlink control information signaling, medium access control element signaling, or radio resource control signaling.

30. The apparatus of claim 28, wherein the memory and the one or more processors are further configured to cause the apparatus to select the at least the second spatial receive beam associated with the second set of quasi co-location parameters by selecting, for each resource set associated with the second resource setting for the interference measurement, a quasi co-location parameter in the second set of quasi co-location parameters sequentially.

31. The apparatus of claim 20, wherein the report configuration comprises a layer one signal to interference and noise ratio report setting or a channel state information report setting or both.

32. The apparatus of claim 20, wherein the first resource setting or the second resource setting, or both comprises zero power channel state information-reference signal resources or non-zero power channel state information-reference signal resources, or both.

33. An apparatus for wireless communication, comprising:

one or more processors of a base station; and memory coupled with the one or more processors, the memory and the one or more processors configured to cause the apparatus to:

allocate a resource for a channel measurement, wherein a first resource setting for the channel measurement comprises the allocated resource;

configure, for a user equipment, a report configuration comprising a first set of quasi co-location parameters for channel measurement and a second set of quasi co-location parameters for interference measurement, wherein:

the first set of quasi co-location parameters comprises a quasi co-location reference indicative of a first spatial receive beam to be used for the channel measurement on the allocated resource, the quasi co-location reference indicative of the first spatial receive beam comprising a first quasi co-location TypeD reference; and wherein the second set of quasi co-location parameters comprises a quasi co-location reference indicative of a second spatial receive beam to be used for the interference measurement; and at least one quasi co-location reference associated with a first quasi co-location parameter of the first set of quasi co-location parameters is different than a quasi co-location reference associated with a second quasi co-location parameter of the second set of quasi co-location parameters; and transmit, via the transceiver, the report configuration to the user equipment.

* * * * *